United States Patent [19]

Hayashi et al.

[11] Patent Number: 4,523,236
[45] Date of Patent: Jun. 11, 1985

[54] VIDEO SIGNAL RECORDING AND REPRODUCING APPARATUS, INCLUDING MEANS FOR DISCRIMINATING THE MODE OF MULTIPLEXING OF AN AUDIO SIGNAL

[75] Inventors: Nobutaka Hayashi; Yoshinori Komori, both of Osaka, Japan

[73] Assignee: Sanyo Electric Co., Ltd., Japan

[21] Appl. No.: 380,825

[22] Filed: May 21, 1982

[30] Foreign Application Priority Data

Jun. 19, 1981 [JP] Japan .................................. 56-95498
Jul. 6, 1981 [JP] Japan ............................ 56-100983[U]

[51] Int. Cl.³ .............................................. H04N 5/76
[52] U.S. Cl. ....................................... 358/341; 360/27
[58] Field of Search ........................ 369/48, 49, 86, 89, 369/111, 124, 128; 360/19.1, 23, 27, 28, 33.1; 358/143, 144, 145, 147, 342, 343, 335, 341; 370/74

[56] References Cited

U.S. PATENT DOCUMENTS

| | | | |
|---|---|---|---|
| 4,013,841 | 3/1977 | Ohkubo et al. | 369/49 |
| 4,092,596 | 5/1978 | Dickinson et al. | 370/74 |
| 4,433,347 | 2/1984 | Sugiyama et al. | 360/97 X |
| 4,445,151 | 4/1984 | Kinoshita et al. | 360/27 |
| 4,446,488 | 5/1984 | Suzuki | 358/342 |

Primary Examiner—Donald McElheny, Jr.
Attorney, Agent, or Firm—Darby & Darby

[57] ABSTRACT

A video signal recording/reproducing apparatus includes a recording medium having a video track and an audio track separately formed, wherein a video signal is recorded in the video track and an audio signal to be multiplexed and a discrimination signal of a low frequency and a low level representing the kind of multiplexing thereof are recorded in the audio track. Decision is made of the kind of multiplexing of the audio signal, such as a bilingual mode, a stereo mode or a monaural mode, as recorded in the audio track, in response to the descrimination signal reproduced from the audio track and a multiplexed audio signal is produced in response to the decision signal representing the kind of the audio signal and the audio signal reproduced from the audio track.

15 Claims, 33 Drawing Figures

FIG. 11
(A) OUTPUT OF 135 
(B) OUTPUT OF 107' 
(C) OUTPUT OF 131 
(A') OUTPUT OF 135 
(B') OUTPUT OF 107' 
(C') OUTPUT OF 131 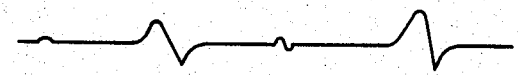

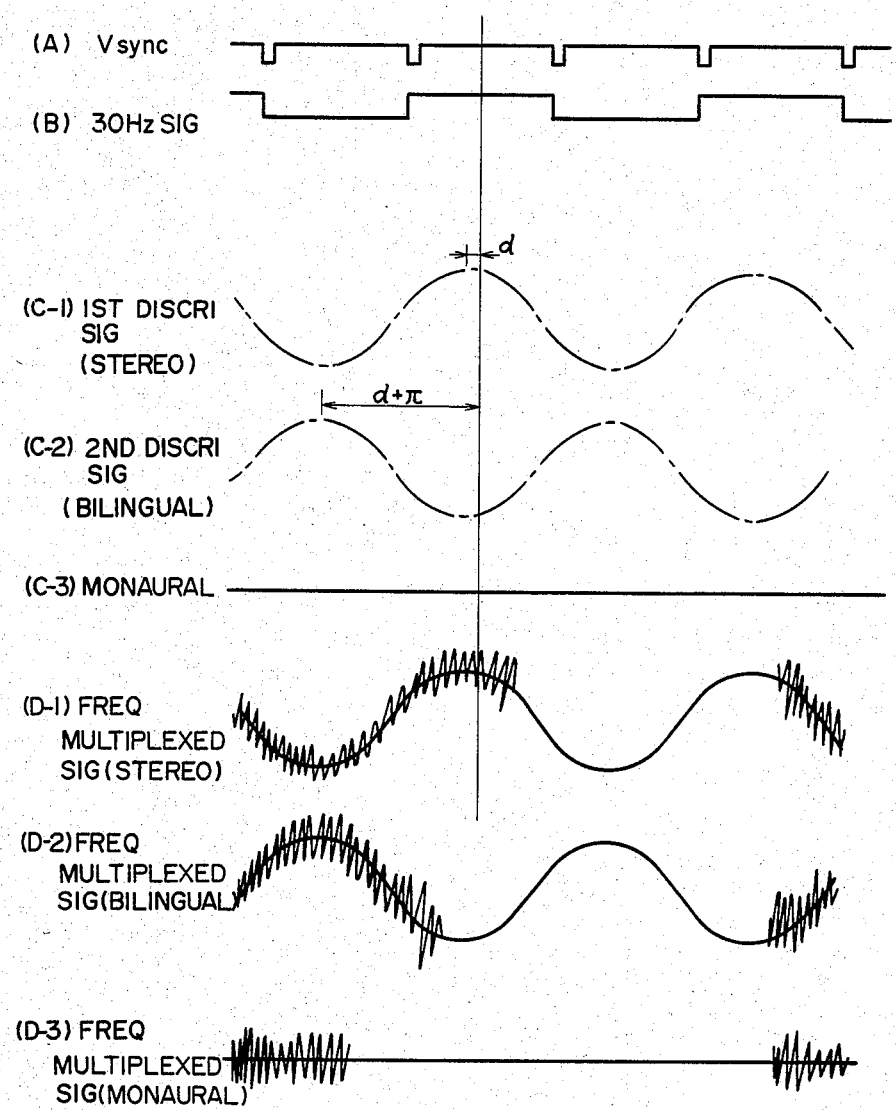

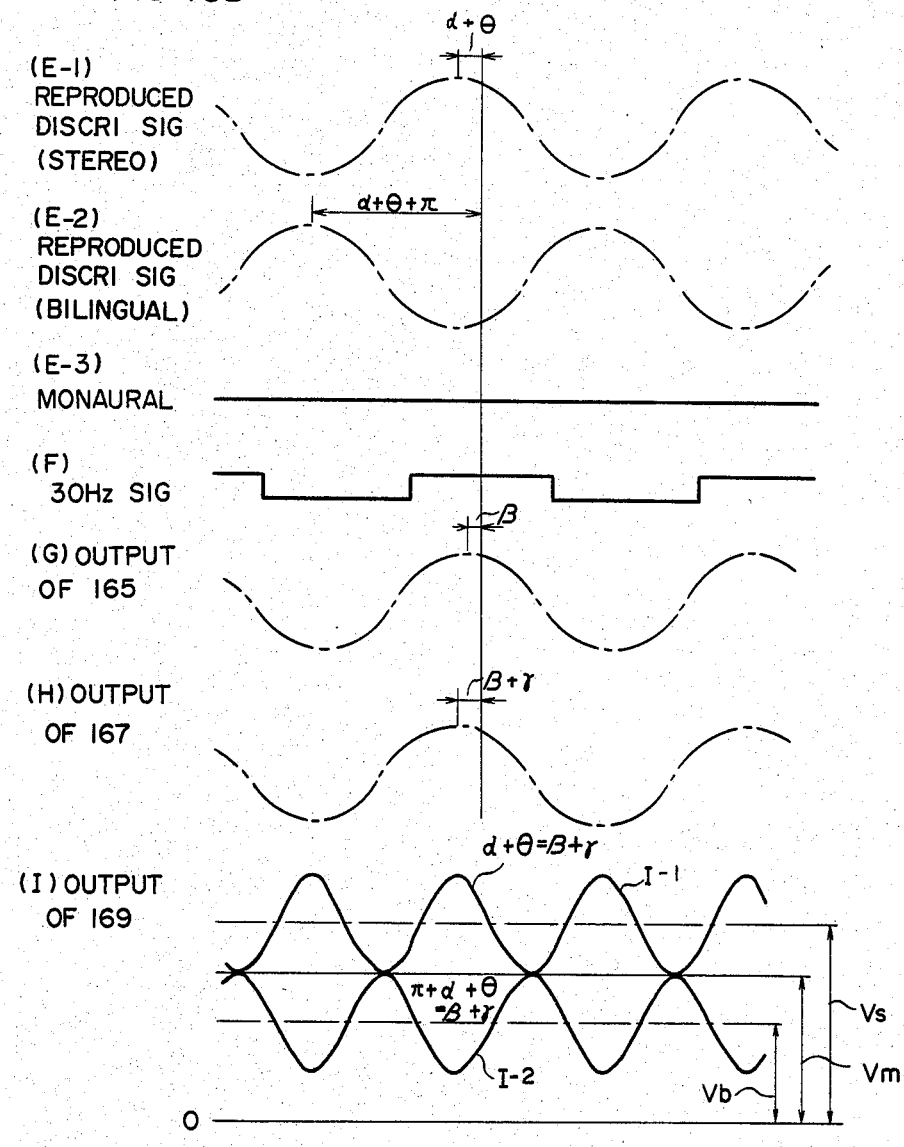

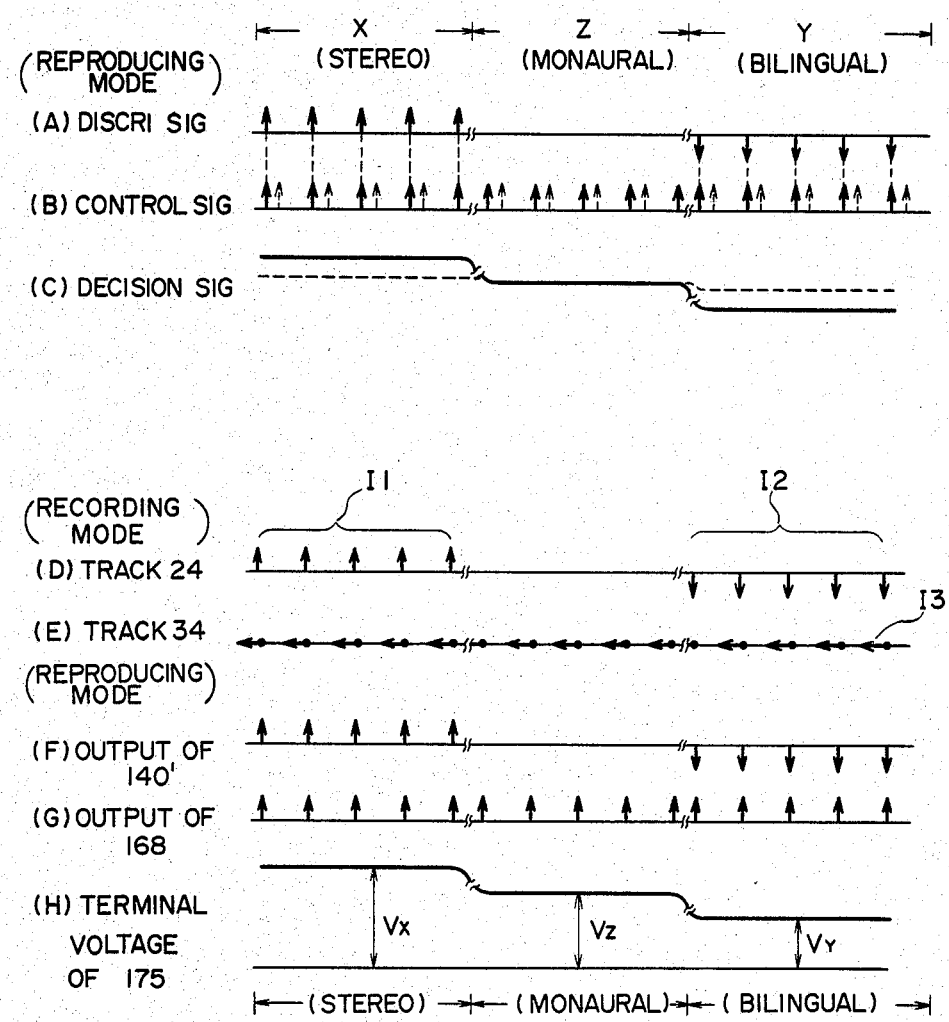

VIDEO SIGNAL RECORDING AND REPRODUCING APPARATUS, INCLUDING MEANS FOR DISCRIMINATING THE MODE OF MULTIPLEXING OF AN AUDIO SIGNAL

BACKGROUND OF THE INVENTION

1. Field of the Invention

The present invention generally relates to a video signal recording/reproducing apparatus. More specifically, the present invention relates to a video signal recording/reproducing apparatus such as a video tape recorder adapted for recording an audio signal to be multiplexed as well as a video signal in a recording medium.

2. Description of the Prior Art

A video tape recorder of a type adapted for recording an audio signal to be multiplexed included in a television signal in an audio track of a video tape and for reproducing the audio signal therefrom has already been proposed. Such proposed video tape recorder is structured such that a multiplexed audio signal included in a transmitted television signal is applied to a decoder, where audio signals of two channels are obtained, and then these audio signals are recorded in two separate audio tracks. The audio signals of two channels constitute a left and right signals, a main and auxiliary signals or the same monaural signals, depending on a stereo mode, a bilingual mode, or a monaural mode, respectively. A conventional video tape recorder of this type has neither a function of discriminating the kinds of multiplexing of an audio signal, such as a stereo mode, a bilingual mode or a monaural mode, recorded on an audio track, nor a function of encoding a reproduced audio signal into a multiplexed audio signal for a television receiver. Therefore, the audio signals of two channels reproduced from a video tape are merely utilized in such a manner as to drive speakers included in a television receiver directly, i.e. without interposition of any particular signal converting circuit, rather than utilized by being supplied from an antenna input to a television receiver. Thus, in the case where speakers of a television receiver are directly driven from a video tape recorder, the signals need not pass through an encoder in a video tape recorder and a signal converting circuit in a television receiver and for this reason chances of degradation of an audio signal can be accordingly decreased; however, this is not necessarily advantageous in consideration of a general connection manner nowadays of a video tape recorder and a television receiver. More specifically, since a video tape recorder and a television receiver are generally connected through an antenna terminal, a supply of an audio signal not by an antenna terminal means that no audio signal can be transferred from a video tape recorder to a television receiver having no input terminal for such audio signal. Even if a television receiver comprises an audio signal input terminal, a video signal input terminal for a single video signal and two audio signal input terminals and signal lines for connection to these terminals need be provided, which makes tiresome connection of a video tape recorder with a television receiver when a video tape recorder is utilized.

In addition, a multiplexed audio signal included in a television signal transmitted from a broadcasting station is formed as a composite signal including an audio signal and a discrimination signal for discrimination of the kind of multiplexing of the audio signal. For example, in a stereo mode an audio signal of one channel comprises an (L+R) signal and an audio signal of the other channel comprises an (L−R) signal as FM modulated and a discrimination signal has AM modulated for representing the stereo mode is also included. The discrimination signal generally has a high frequency, say 55.125 kHz and the current rated recording format makes it impossible to record the same as such in a video tape. More specifically, according to the current rated recording format a video track and an audio track are separately formed and the video track is recorded in a helical scan manner. Therefore, recording of a video signal of a wide range as such is allowed but recording of a discrimination signal in a video track is not allowed. Accordingly, assuming that a discrimination signal is recorded in a video tape, only the way is to record the same in an audio track; however, a discrimination signal is a high-frequency signal, as described above, and the same as such cannot be recorded on an audio track. The reason is that a relative speed of a recording head with respect to an audio track is very low, say as low as 1.3 cm/sec and accordingly the upper limit of the frequency of a recordable signal would be approximately 10 kHz. Therefore, any existing prior art video tape recorders comprise a manual switch separately provided for the purpose of discriminating the kind of an audio signal being recorded, i.e. a stereo mode, a bilingual mode or a monaural mode, in supplying a television signal to a television receiver. However, such conventional video tape recorders adapted for manually discriminating the kind of an audio signal involve another disadvantage that convenience of manual operation is poor.

SUMMARY OF THE INVENTION

Accordingly, a principal object of the present invention is to provide an improved video signal recording/reproducing apparatus adapted for recording a signal for discriminating the kind or mode of multiplexing of an audio signal in a recording medium and for automatically discriminating the kind of an audio signal by reproducing the same.

A video recording/reproducing apparatus in accordance with the present invention comprises a recording medium, means for recording an audio signal in said recording medium, said audio signal being recorded in a different mode including a stereo mode, a bilingual mode or a monaural mode, means for recording in said recording medium a mode discrimination signal representing the mode of said audio signal, means for reproducing said audio signal from said recording medium, means for reproducing said mode discrimination signal from said recording medium, means responsive to said reproduced mode discrimination signal for generating a decision signal representing the mode of said audio signal being recorded, and means responsive to said reproduced audio signal and said decision signal for reproducing an audio signal multiplexed in said mode including said stereo mode, said bilingual mode or said monaural mode.

A video signal recording/reproducing apparatus in accordance with one preferred embodiment of the present invention comprises a recording medium having an audio track and a video track separately formed, in which an audio signal and a discrimination signal for discriminating the kind of multiplexing of the audio signal are recorded on an audio track in a superimposed manner. Such discrimination signal is of a frequency allowing for recording the same on the audio track and for reproducing the same therefrom, say a frequency selected to be lower than 10 kHz and preferably as very low as 15 to 20 Hz and such discrimination signal is recorded with a relatively low level say as low as 10 to 30 dB as compared with an audio signal. A decision signal for representing the kind of an audio signal being recorded, such as a stereo mode, a bilingual mode or a monaural mode, is obtained in response to the discrimination signal reproduced from the audio track.

In another preferred embodiment of the present invention, means such as an encoder is provided for producing a multiplexed audio signal for supplying the same to a television receiver in response to an audio signal reproduced from an audio track and a decision signal obtained in the above described manner. A multiplexed audio signal obtained from the encoder as well as a video signal reproduced from a video track and properly processed is applied to an RF modulator. The RF modulator is responsive to the video signal and the multiplexed audio signal to produce a television signal of a different frequency in the same format as transmitted from an ordinary broadcasting station. Accordingly, an output signal form the RF modulator is obtained as an RF television signal including a multiplexed audio signal and, therefore, the same is as such applied to an antenna terminal of a television receiver. Since the television receiver receives a television signal of the same format as that of an ordinary broadcasting wave from a video signal recording/reproducing apparatus, it is not necessary to provide a separate input terminal in a television receiver and as a result complicated connection of connecting wires can be eliminated.

In a further preferred embodiment of the present invention, a recorded discrimination signal includes the kind information in terms of the frequency thereof. In still a further embodiment of the present invention, a discrimination signal includes the kind information in terms of the phase while the frequency is the the same is utilized.

These objects and other objects, features, aspects and advantages of the present invention will become more apparent from the following detailed description of the present invention when taken in conjunction with the accompanying drawings.

BRIEF DESCRIPTION OF THE DRAWINGS

FIG. 11 consisting of (A)–(C') is a graph showing waveforms for explaining an operation of the FIG. 10 embodiment;

FIGS. 13A and 13B are graphs showing waveforms for explaining an operation of the FIG. 12 embodiment;

FIG. 21 is a timing chart for explaining an operation of the FIG. 19 embodiment in comparison with that of FIG. 12 embodiment;

DESCRIPTION OF THE PREFERRED EMBODIMENTS

Figure 1:
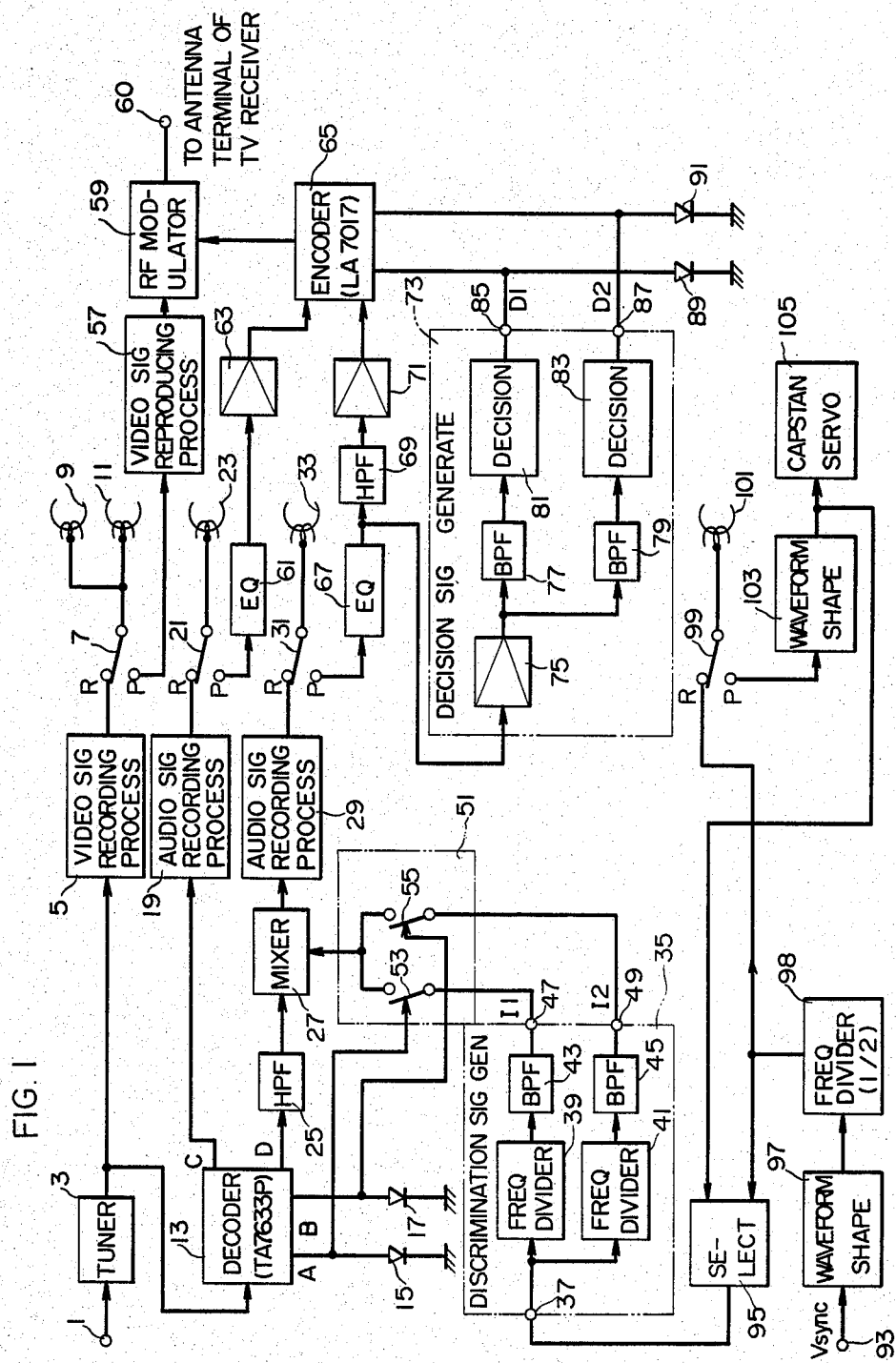
FIG. 1 is a block diagram showing one embodiment of the present invention.

FIG. 1 is a block diagram showing one embodiment of the present invention. The embodiment shown and any further embodiments to be described subsequently are shown as embodied in a case where the present invention is applied to a video tape recorder; however, it is pointed out that the present invention is not limited only to a video tape recorder.

Figure 2:
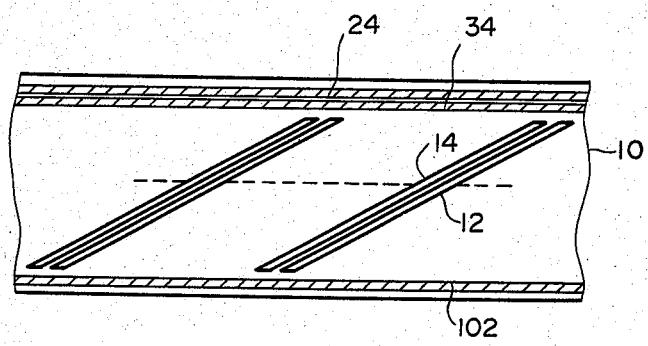
FIG. 2 is a view showing one example of a recording format of a video tape.

A television signal obtained from an antenna, not shown, is applied to an input terminal 1 and the television signal is applied to a tuner 3. The tuner 3 provides a standard television signal including a video signal and the multiplexed audio signal. The video signal is applied to a video signal recording processing portion 5. The video signal recording processing portion 5 serves to process the video signal so as to be suitable for recording thereof in a video tape, not shown, as well-known, and the processed signal is applied through a switch 7 to two video heads 9 and 11. As well-known, these two video heads 9 and 11 form video tracks 12 and 14, respectively, on a video tape 10 in a format as shown in FIG. 2.

On the other hand, a television signal obtained from the tuner 3 is also applied to a decoder 13. The decoder 13 serves to decode the multiplexed audio signal included in the television signal into audio signals C and D of two channels and also to signals A and B representing the kind of multiplexing of the audio signal, say a stereo mode, a bilingual mode or a monaural mode. The decoder 13 may be implemented by an integrated circuit TA7633P, manufactured by Tokyo Shibaura Electric Company Ltd., Japan. More specifically, the decoder 13 provides the signals as shown in Table I to the output terminals A, B, C and D in accordance with the kind of the multiplexed audio signal.

TABLE I

|  | A | B | C | D |
|---|---|---|---|---|
| Stereo Mode | H level | L level | L signal | R signal |
| Bilingual Mode | L level | H level | M signal | S signal |
| Monaural Mode | L level | L level | Mo Signal | Mo Signal |

Referring to Table I, the L signal and the R signal denote a left signal and a right signal, respectively, the M signal and the S signal denote a main signal and an auxiliary signal, respectively, and the Mo signal denotes the same monaural signal.

This example of such television audio multiplex broadcasting has been presently adopted in Japan and audio multiplexed broadcasting has also been adopted in West Germany.

Indicators 15 and 17 are provided to be driven for display in response to the signals A and B, respectively, of the high level from the decoder 13, so that the indicator 15 is driven for display in a stereo mode and the indicator 17 may be driven for display in a bilingual mode, while the two indicators 15 and 17 are both not driven for display in a monaural mode. Thus an operator can learn the current recording mode from the states of the indicators 15 and 17. An audio signal of one channel from the decoder 13 is applied to an audio signal recording processing portion 19 and, as well-known, the same is processed so as to be suited for recording and the processed signal is supplied through a switch 21 to an audio head 23. An audio signal of the other channel from the decoder 13 is applied through a high-pass filter 25 and a mixer 27 to an audio signal recording processing portion 29, where the signal is processed so as to be suited for recording, and the processed signal is applied through a switch 31 to another audio head 33. The two audio heads 23 and 33 form first and second audio tracks 24 and 34, respectively, as shown in FIG. 2. The high-pass filter 25 is adapted to exhibit a cutoff frequency of say 50 Hz so that a component lower than 50 Hz of the audio signal of the other channel may be attenuated, and a discrimination signal I1 or I2 to be described subsequently is superimposed on the range where the audio signal is attenuated. The mixer 27 thus superimposes the discrimination signal I1 or I2 obtained from a switch circuit 51 to be described subsequently on the range where the audio signal is attenuated. Accordingly, the audio signal recording processing portion 29 could be supplied with not only the audio signal of the other channel but also the added discrimination signal. Accordingly, it could happen that the discrimination signal is included in addition to the audio signal in the audio track 34 (FIG. 2) formed by the audio head 33.

A discrimination signal producing circuit 35 receives a reference signal having the frequency of 30 Hz for example (in the case of the NTSC system) at the input terminal 37. As to be described subsequently, the reference signal is a vertical synchronizing signal Vsync included in the television signal or a control signal being applied to a capstan servo circuit 105 to be described subsequently. The reference signal of 30 Hz applied to the input terminal 37 is applied to frequency dividers 39 and 47 having different frequency division ratios. The frequency divider 39 frequency divides at the frequency division ratio of ½ the reference signal to provide a signal of 15 Hz, while the frequency divider 41 frequency divides at the frequency division ratio of ⅔ to provide a signal of 20 Hz. The signal of 15 Hz from the frequency divider 39 is applied through a bandpass filter 43 and an output terminal 47 to a switch circuit 51 as a first discrimination signal I1. Similarly, the signal of 20 Hz from the frequency divider 41 is applied through a bandpass filter 45 and an output terminal 49 to a switch circuit 51 as a second discrimination signal I2. Thus, the discrimination signal producing circuit 35 provides the discrimination signal I1 or I2 in a mode other than the monaural mode in the case of at least the recording operation. The switch circuit 51 comprises switches 53 and 55 for receiving the two discrimination signals I1 and I2, respectively, and the outputs of these switches 53 and 55 are commonly applied to the mixer 27. The switches 53 and 55 are closed by the signals A and B of the high level, respectively, from the decoder 13.

More specifically, in the case where the audio signal to be recorded is of a stereo mode, the signal A from the decoder 13 becomes the high level and the switch 53 included in the switch circuit 51 is closed and the first discrimination signal I1 (15 Hz) from the output terminal 47 of the discrimination signal producing circuit 35 is applied to the mixer 27. Accordingly, in the stereo mode the first discrimination signal I1 as well as the right (R) signal is recorded on the second audio track of the tape 10 (FIG. 2). On the other hand, in the bilingual mode the switch 55 of the switch 51 is closed in response to the signal B of the high level from the decoder 13 and the second discrimination signal I2 (20 Hz) from the output terminal 49 of the discrimination signal producing circuit 35 is applied through the switch 55 to the mixer 27. Accordingly, in the bilingual mode the auxiliary (S) signal as well as the second discrimination signal I2 is recorded in the second audio track 34. In the monaural mode, both the signals A and B from the decoder 13 are the low level and both of the switches 53 and 55 included in the switch 51 remain opened, so that no discrimination signal is applied to the mixer 27. Accordingly, in the monaural mode only the monaural (Mo) signal is recorded on the second audio track 34. Meanwhile, the mixer 27 limits the level of the discrimination signal so that the respective discrimination signal I1 or I2 may be recorded with the level 10 to 30 dB lower as compared with the audio signal by means of the head 33. Thus consideration has been given such that the discrimination signal I1 or I2 may not be interfered with an audio signal.

The vertical synchronizing signal Vsync extracted from the television signal is applied through a terminal 93 to a waveform shaping circuit 97. The waveform shaping circuit 97 shapes the waveform of the vertical synchronizing signal Vsync to provide a square wave signal of 60 Hz, for example. The square waveform signal is applied through a frequency divider 98 having the frequency division ratio of ½ and a selection circuit 95 to the input terminal 37 of the above described discrimination signal producing circuit 35 as a reference signal and is also applied through a switch 99 to a control head 101. Accordingly, the control head 101 forms a control track 102 on the tape 10 (FIG. 2). The selection circuit 95 is provided for selectively providing the output of the frequency divider 98 or 103 to the input terminal 37 in the recording mode or the reproducing mode.

Now description will be made of a reproducing circuit. Since the reproducing circuit may be considered as a reverse of the recording circuit, in actuality most of the mechanisms and the circuits of the reproducing circuit are formed to be shared with those of the recording circuit; however, for convenience of description the present invention is depicted as comprising separate reproducing circuit.

The switches 7, 21, 31 and 99 are turned from the contacts R for the recording mode to the contacts P for the reproduction mode by means of an operation switch, not shown. When the switch 7 is turned to the reproduction mode, a video signal reproduced by the video heads 9 and 11 from the video tracks 12 and 14 (FIG. 2) is applied to the video signal reproducing processing portion 57. The video signal reproducing processing portion 57 reconstructs the given reproduced video signal to a format of a standard television signal and the same is applied to the RF modulator 59 having the same function as that of an ordinary broadcasting station. When the switch 21 is turned to the reproduction mode, the audio signal of the first channel reproduced from the first audio track 24 by the first audio head 23 is obtained and is applied through an equalizer 61 and an amplifier 63 to an audio multiplexing encoder 65. When the switch 31 is turned to the reproduction mode, the audio signal reproduced from the second audio track 34 by the audio head 33 and the discrimination signal added as necessary are obtained and are applied through an equalizer 67, a high-pass filter 69 and an amplifier 71 to an encoder 65. The high-pass filter 69 also has a cutoff frequency of approximately 50 Hz as in the case of the previously described high-pass filter 25 and cuts off a low-frequency component of the signal obtained from the second audio track 34 reproduced by the head 33.

Figure 3:
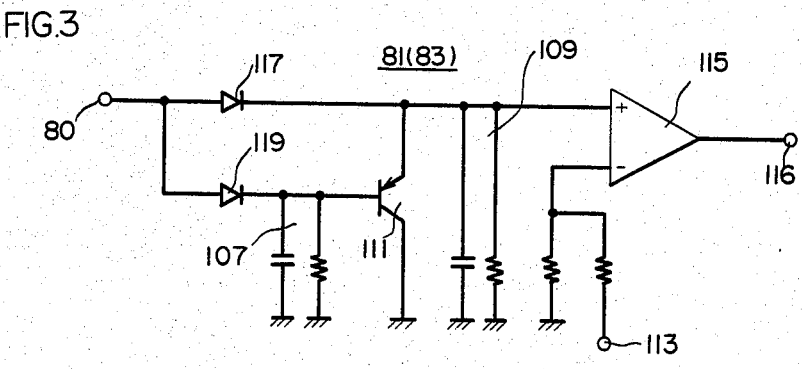
FIG. 3 is a block diagram showing one example of a decision circuit included in the FIG. 1 embodiment.

The reproduced signal from the equalizer 67 is further applied to a decision signal generating circuit 73. The decision signal generating circuit 73 is provided for producing decision signals D1 and D2 representing the kind of multiplexing of the audio signal as recorded and reproduced. An amplifier 75 included in the decision signal generating circuit 73 receives a reproduced signal from the equalizer 67 and the output from the amplifier 75 is applied to bandpass filters 77 and 79 having different passbands. The bandpass filter 77 is adapted to extract a signal of 15 Hz and the bandpass filter 79 is adapted to extract a signal of 20 Hz from the reproduced signal. The respective outputs from the bandpass filters 77 and 79 are applied to the decision circuits 81 and 83, respectively. The decision circuits 81 and 83 each comprise a circuit configuration as shown in FIG. 3 to be described subsequently and serves to determine whether the level of the signal obtained from the corresponding bandpass filter 77 or 79 exceeds a predetermined value. When the signal of 15 Hz, i.e. the first discrimination signal I1 is included in the reproduced signal, a decision signal of the high level is obtained from the decision circuit 81 and the signal D1 is applied through the output terminal 85 to the encoder 65. The decision circuit 83 provides the decision signal D2 of the high level when the signal of 20 Hz, i.e. the second discrimination signal I2 is included in the reproduced signal, so that the signal D2 is applied through the output terminal 87 to the encoder 65. The output terminals 85 and 87 of the decision signal generation circuit 73 are connected to the indicators 89 and 91, respectively, so that the indicator 89 is driven for display when the decision signal D1 is the high level and the indicator 91 is driven for display when the decision signal D2 is the high level. More specifically, when the reproduced audio signal to be multiplexed is of a stereo mode, the decision signal D1 of the high level is obtained from the decision signal generating circuit 73 and the indicator 89 is driven for display, so that the stereo mode is displayed. On the other hand, in the bilingual mode the signal D2 of the high level is obtained from the output terminal 87 and the indicator 91 is driven for display, so that it is displayed that the reproduced audio signal to be multiplexed was recorded in the bilingual mode. In the case of the monaural mode, both the decision signals D1 and D2 are the low level, so that neither the indicator 89 nor 91 is driven for display, whereby it is displayed that the audio signal being currently reproduced was recorded in the monaural mode.

The audio multiplexing encoder 65 may be implemented by an integrated circuit, LA7017, manufactured by Tokyo Sanyo Electric Company Ltd., Tokyo, Japan. The encoder 65 is responsive to the first and second channel audio signals obtained from the amplifiers 63 and 71 and the decision signal D1 or D2 obtained from the decision signal generating circuit 73 to form an audio signal multiplexed in a stereo mode, a bilingual mode or a monaural mode having the same format as that of the ordinary broadcasting wave, which is then applied to the RF modulator 59. The RF modulator 59 is responsive to the reproduced video signal formed in an ordinary television signal obtained from the video signal reproducing processing portion 57 and the audio signal formed in an ordinary television multiplexed audio signal from the encoder 65 to provide the same RF signal as the broadcasting wave and the RF signal is applied from the output terminal 60 to an antenna terminal of a television receiver, not shown. Thus, the output signal as such obtained from a video tape recorder can be applied to an antenna terminal of a television receiver (not shown). Therefore, it is not necessary to provide a specific connection terminal in a television receiver and accordingly no complicated connecting work is required.

When the switch 99 is turned to the reproduction mode, the control signal of 30 Hz is read out from the control track 102 of the tape 10 (FIG. 2) by means of the control head 101 and the reproduced control signal is applied to the waveform shaping circuit 103. The waveform shaping circuit 103 shapes the reproduced control signal to a rectangular waveform and the same is applied to the capstan servo circuit 105 and is also applied to the previously described selection circuit 95. The capstan servo circuit 105 is provided for the purpose of servo controlling the capstan motor of a video tape recorder so that the tape may be driven to be fed in synchronism with the rotation of the heads 9 and 11. Thus, in the reproduction mode the reproduction control signal of 30 Hz may be applied from the selection circuit 95 to the input terminal 37 of the discrimination signal producing circuit 35.

The details of the decision circuit 81 included in the decision signal generating circuit 73 are shown in FIG. 3. The decision circuit 81 comprises a first integrating circuit 107 having a time constant t1 and a second integrating circuit 109 having a second time constant t2 which is larger than the time constant t1. A switching transistor 111 is interposed between the integrating circuits 107 and 109. The signal of 15 Hz from the bandpass filter 77 (FIG. 1) is applied from the input terminal 80 and the signal is applied through the diode 119 to the first integrating circuit 107 and is also applied through the diode 117 to the second integrating circuit 107. The output of the first integrating circuit 107 is applied to the base of the switching transistor 111 and the emitter-collector of the switching transistor 111 is connected between the input of the second integrating circuit 109 and the ground potential. The output of the second integrating circuit 109 is applied to the + input of the comparator 115 including an operational amplifier. The − input of the comparator 115 is supplied with the reference voltage from the terminal 113. The output 116 of the comparator 115 is connected to the output terminal 85. The other decision circuit 83 is also similarly structured and therefore a repeated description will be omitted.

Figure 4:
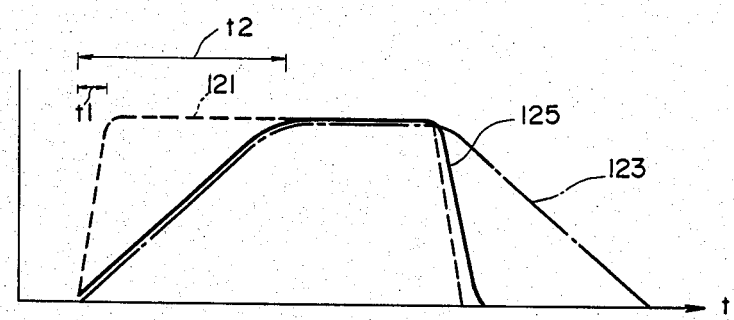
FIG. 4 is a graph for explaining an operation of the FIG. 3 embodiment.
Figure 5:
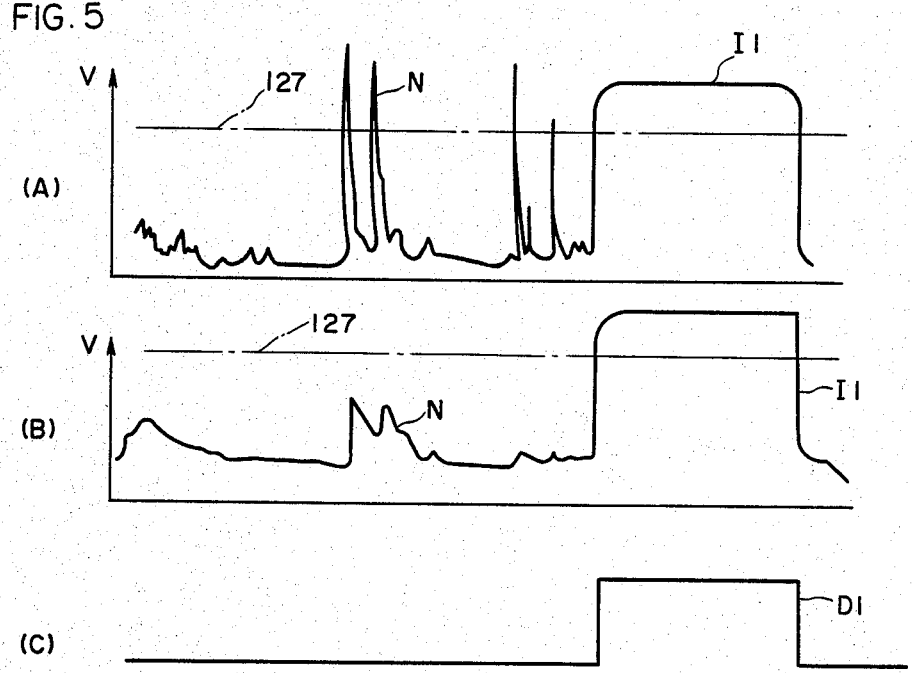
FIG. 5 consisting of (A)–(C) is a graph showing waveforms for explaining an operation of the embodiments shown in FIGS. 1 and 3.

The first integrating circuit 107 has a transfer characteristic as shown by dotted line 121 in FIG. 4 and the second integrating circuit 109 has a transfer characteristic as shown by one dotted line 123 in FIG. 4. Accordingly, the transfer characteristic up to the + input of the comparator 115 becomes as shown by the solid line 125 in FIG. 4. In other words, if and when the duration of the signal of 15 Hz obtained from the input terminal 80 is shorter than a time period determined by the time constant t1 of the first integrating circuit 107, no signal is applied to the second integrating circuit 109. More specifically, when the output of the first integrating circuit 107 is smaller than a predetermined value, the switching transistor 111 remains in a conductive state and the signal of 15 Hz obtained through the diode 117 flows through the switching transistor 117 into the ground potential and is not applied to the second integrating circuit 109. If the duration of the signal of 15 Hz is longer, then the switching transistor 111 is soon interrupted in response to the output of the integrating circuit 107 and the signal of 15 Hz from the input terminal 80 is applied to the second integrating circuit 109. Accordingly, if and when the signal of 15 Hz, i.e. the first discrimination signal I1, including a noise component N as shown as (A) in FIG. 5 is obtained, a signal having the amplitude of the noise component N suppressed as shown as (B) in FIG. 5 is applied to the + input of the comparator 115. By setting the comparison level 127 of the comparator 115 by means of the reference voltage 113, a proper decision signal D1 not having been influenced by a noise component, as shown as (C) in FIG. 5, can be obtained at the output terminal 116 of the comparator 115. More specifically, the decision circuit 81 can provide a decision signal D1 responding only to the component of a true or normal discrimination signal I1.

Meanwhile, the second decision circuit 83 is also similarly structured so that only when a true or normal discrimination signal I2 is obtained a decision signal D2 may be obtained only in response thereto.

Such decision circuits for preventing malfunction due to a noise component are particularly effective when a tape recorded with a discrimination signal not in accordance with the present invention is reproduced. More specifically, when a tape recorded not in accordance with the present invention is reproduced, there is a possibility that a noise component as shown as (A) in FIG. 5 is applied to the decision circuits; however, since the decision circuits 81 and 83 are not responsive to such noise component, normal function occurs even when a tape recorded not in accordance with the present invention is reproduced and thus the present embodiment is extremely advantageous. Since the frequency of the discrimination signal has been selected to be a frequency which is capable of being recorded in an audio track and being reproduced therefrom, it could happen that a signal similar to a discrimination signal exists in an audio signal. Even in such a case, an erroneous response to such audio signal can be avoided by employing the above described decision circuits 81 and 83.

Figure 6:
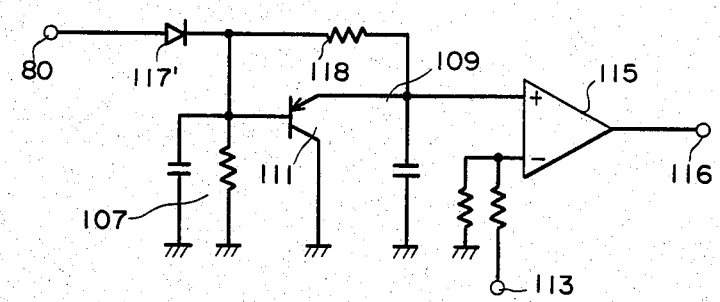
FIG. 6 is a schematic diagram of another example of a decision circuit for use in the FIG. 1 embodiment.

FIG. 6 is a schematic diagram showing another example of the decision circuit 81 (and thus 83). In the FIG. 6 embodiment the signal of 15 Hz obtained from the input terminal 81 is applied through the diode 117 to the first integrating circuit 107 and is also applied through the resistor 118 to the second integrating circuit 109. Since the remaining portions are substantially the same as those in the FIG. 3 embodiment, a repeated description will be omitted, by denoting the components of the same functions with the same reference characters.

When a television audio signal as multiplexed in a stereo mode is applied to the decoder 13 in a video tape recorder structured described above, the output signal A becomes the high level and the switch 53 is closed and as a result the first discrimination signal I1 from the discrimination signal producing circuit 35 as well as the audio signal of the other channel, i.e. the right (R) signal is recorded in the second audio track 34. The discrimination signal included in the reproduced signal from the second audio track 34 is detected by the decision circuit 81 and the decision signal D1 of the high level is obtained. The decision signal D1 as well as the reproduced left (L) signal and the right (R) signal is applied to the encoder 65, where the same is converted into a predetermined television multiplexed audio signal, whereupon the same is applied to the RF modulator 59. The multiplexed audio signal is then FM modulated with the frequency corresponding to the audio frequency of a vacant channel where no television broadcasting is made in the RF modulator 59 and the output is applied to the output terminal 60, i.e. the antenna terminal of the television receiver (not shown). Meanwhile, the RF modulator 59 AM modulates the video signal obtained from the video signal reproducing processing portion 57 to a frequency corresponding to the video frequency of said vacant channel, whereby the output is applied to the antenna terminal of the television receiver.

When the multiplexed audio signal is of a bilingual mode, the output signal B of the decoder 13 becomes the high level. Accordingly, the switch 55 is closed and the first discrimination signal I2 of 20 Hz obtained from the discrimination signal producing circuit 35 and the audio signal of the other channel, i.e. the auxiliary (S) signal is recorded in the second audio track 34 of the tape 10. The second discrimination signal I2 of 20 Hz included in the reproduced signal from the second audio track 34 is detected by the decision circuit 83 and the decision signal D2 of the high level is obtained. The encoder 65 is supplied with the main (M) signal of one channel and the auxiliary (S) signal of the other channel together with the decision signal D2 from the decision signal generating circuit 73 and the encoder 65 is responsive to the main signal and the auxiliary signal as well as the discrimination signal D2 to produce a standard television multiplexed audio signal of a bilingual mode, which is then applied to the RF modulator 59. The RF modulator 59 produces an RF signal corresponding to a vacant channel of no television broadcasting, as in the case of the previously described stereo mode.

Table II shows the contents of the signals recorded in the audio tracks 24 and 34 for the respective modes. Referring to Table II, L denotes a left signal, R denotes a right signal, M denotes a main signal, S denotes an auxiliary signal, Mo denotes a monaural signal, I1 denotes a first discrimination signal and I2 denots a second discrimination signal.

TABLE II

|  | stereo mode | bilingual mode | monaural mode |
| --- | --- | --- | --- |
| first audio track | L | M | Mo |
| second audio track | R + I1 | S + I2 | Mo |

The above described embodiment was adapted such that the discrimination signal I1 or I2 is recorded only in the second audio track 34. However, in other embodiments it may be adapted such that the discrimination signal I1 or I2 is recorded both in the first and second audio tracks 24 and 34 or the same may be recorded only in the first audio track 24. Such modifications can be made as necessary by those skilled in the art.

The frequency of the discrimination signal need not be limited to 15 Hz or 20 Hz but may be arbitrarily selected to any frequency which does not interfere with an audio signal and, in the PAL system, for example, any proper frequency division ratio may be employed in the frequency dividers 39 and 41 included in the discrimination signal producing circuit 35 in consideration of the fact that the vertical synchronizing signal Vsync is 50 Hz.

Figure 7:
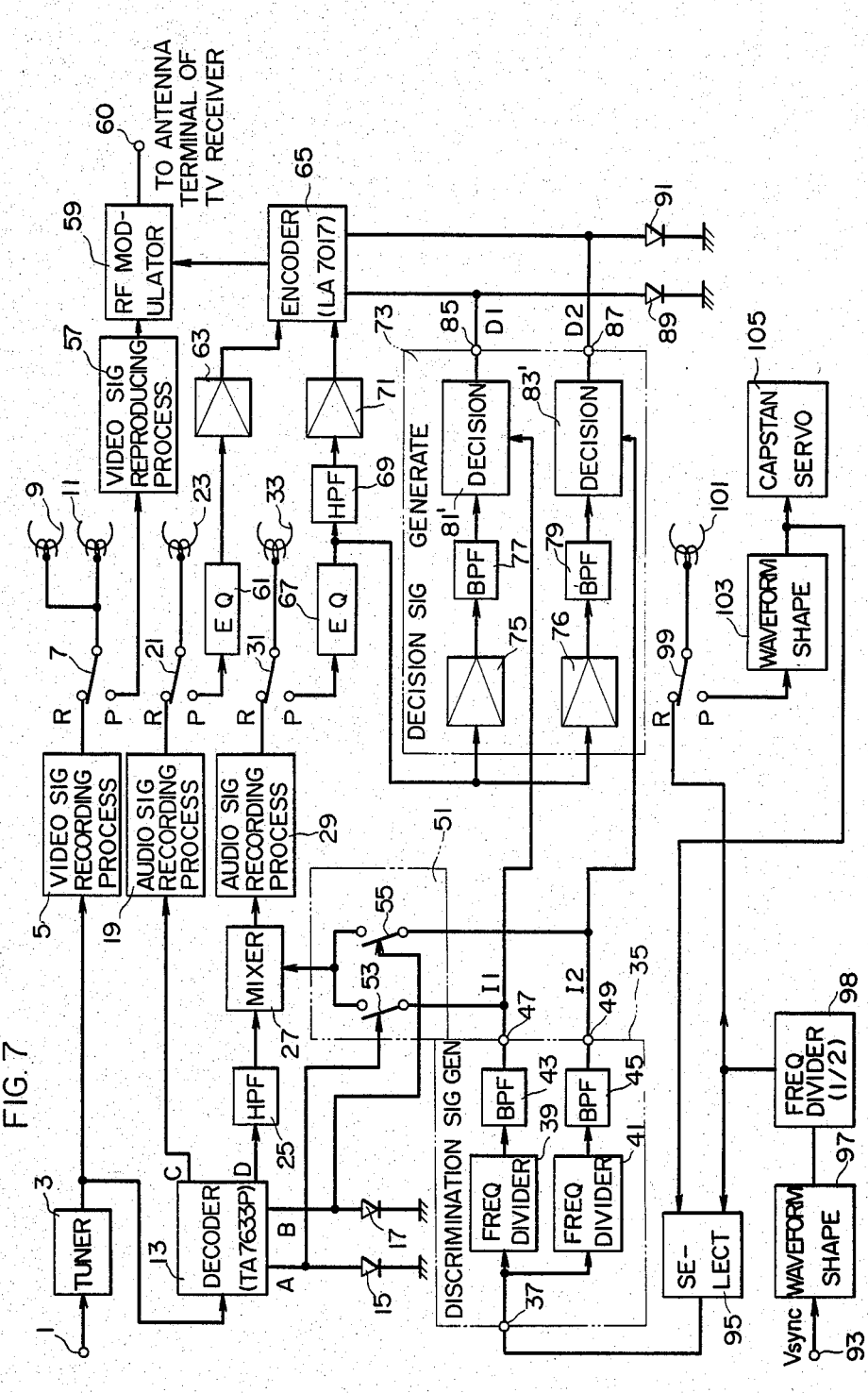
FIG. 7 is a block diagram showing another embodiment of the present invention, wherein a decision signal generating circuit has been modified as compared with the FIG. 1 embodiment.

FIG. 7 is a block diagram showing a preferred modification of the FIG. 1 embodiment. Those components of the FIG. 7 embodiment performing the same functions as those of the FIG. 1 embodiment are denoted by the same reference characters and a major difference of the FIG. 7 embodiment will be described in the following. In brief, the FIG. 7 embodiment is characterized by the decision signal generating circuit 73.

The decision signal generating circuit 73 of the FIG. 7 embodiment comprises two amplifiers 75 and 76 receiving the reproduced signal from the second track 34 through the equalizer 67. The output from the amplifier 75 is applied to a bandpass filter 77 for passage of the signal 15 Hz and the output from the amplifier 76 is applied to a bandpass filter 79 for passage of the signal of 20 Hz. Meanwhile, the embodiment may be modified such that the amplifier 76 is omitted and the two bandpass filters 77 and 79 both receives the output of the amplifier 75, as done in the FIG. 1 embodiment. The output from the bandpass filters 77 and 79 are applied to the decision circuits 81' and 83', respectively. On the other hand, the decision circuits 81' and 83' are also supplied with the discrimination signals I1 and I2 from the discrimination signal producing circuit 35. In brief, the decision circuits 81' and 83' compare the phases of the normal discrimination signals I1 and I2 and the output from the bandpass filters 77 and 79, thereby to prevent malfunction from occurring in response to a noise component and any other audio component.

Figure 8:
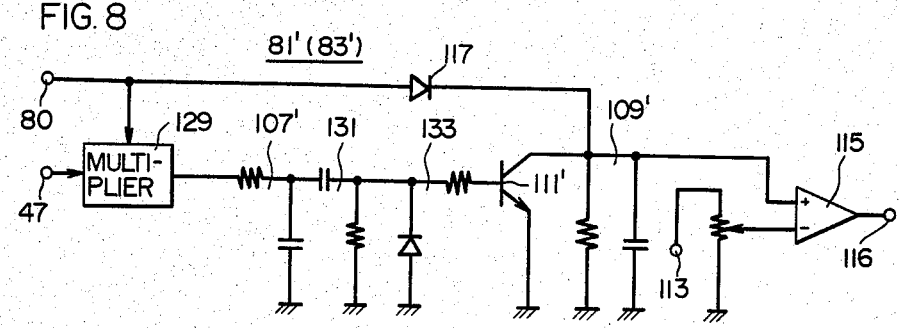
FIG. 8 is a schematic diagram of one example of a decision circuit for use in the FIG. 7 embodiment.

The decision circuits 81' and 83' may be substantially the same and therefore only one decision circuit 81' will be described with reference to FIG. 8. The decision circuit 81' comprises a multiplier 129 having one input connected to the output terminal 47 of the discrimination signal producing circuit 35 and having the other input connected to the input terminal 80, i.e. the output of the bandpass filter 77. The multiplier 129 comprises an analog multiplier and may be implemented by an integrated circuit TA7320P, manufactured by Tokyo Shibaura Electric Company Ltd., Tokyo, Japan. The output of the multiplier 129 is applied through a low-pass filter 107' for passage of the frequency of 15 Hz of the fundamental wave component of the first discrimination signal I1, a high-pass filter 131 receiving the output of the low-pass filter 107' for passing the fundamental wave component and for blocking the low-frequency component, and a rectifying circuit 133 for rectifying the output of the high-pass filter 131 to the base of a switching transistor 111'. The transistor 111' is responsive to the level of the output of the rectifying circuit 133 to cause the signal of 15 Hz from the diode 117 to flow to the ground potential or a smoothing circuit 109'. The output from the smoothing circuit 109' is applied to the + input of the comparator 115 such as an operational amplifier. The − input of the comparator 115 is supplied with the reference voltage 113.

Figure 9:
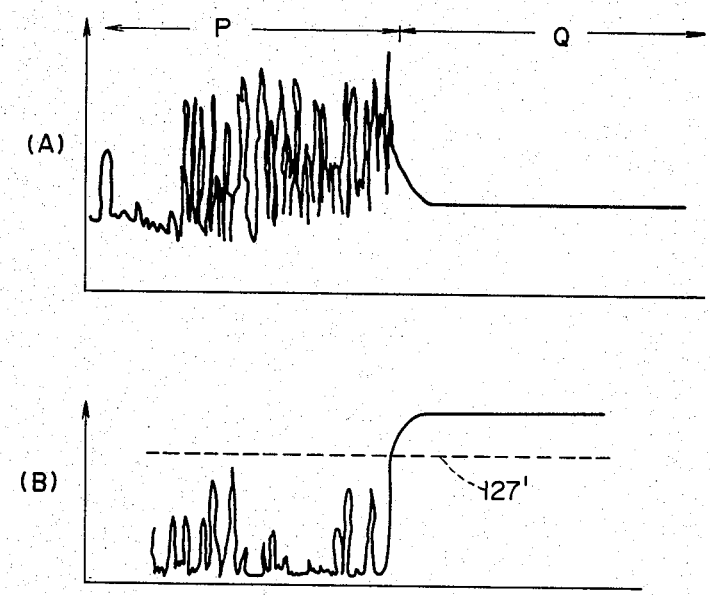
FIG. 9 is a graph showing waveforms for explaining an operation of the embodiments shown in FIGS. 7 and 8.

When the decision circuit 81' is supplied with the original discrimination signal I1 from the output terminal 47 and the reproduced signal of 15 Hz from the input terminal 80, a signal of a constant level as shown in the region Q of (A) in FIG. 9 is obtained at the output of the low-pass filter 107'. The reason is that there is a predetermined phase relation between the original discrimination signal I1 and the reproduced signal thereof.

If and when merely a pseudosignal of 15 Hz but not of the reproduced discrimination signal is obtained at the output of the bandpass filter 77, a phase relation between the original discrimination signal from the terminal 47 and the pseudodiscrimination signal is uncertain and therefore an alternating signal as shown in the region P of (A) in FIG. 9 is obtained at the output of the low-pass filter 107. Thus, if and when a true discrimination signal has been reproduced, the high level output is obtained at the base of the switching transistor 111' and, when the pseudodiscrimination signal is obtained, the low level output is obtained. Accordingly, a signal as shown as (B) in FIG. 9 is applied to the + input of the comparator 115 and, by setting the − input of the comparator 115 as shown as the dotted line 127' of (B) in FIG. 9, the decision signal D1 of the high level is obtained only in the region Q in FIG. 9, i.e. only when the true or normal discrimination signal has been reproduced. In other words, the phases of the original discrimination signal and the reproduced signal are compared using the multiplier 129 and the other associated circuits, whereby it can be known whether a true discrimination signal has been reproduced, thereby to effectively prevent malfunction from occurring due to an audio signal similar to the discrimination signal or a noise component.

Figure 10:
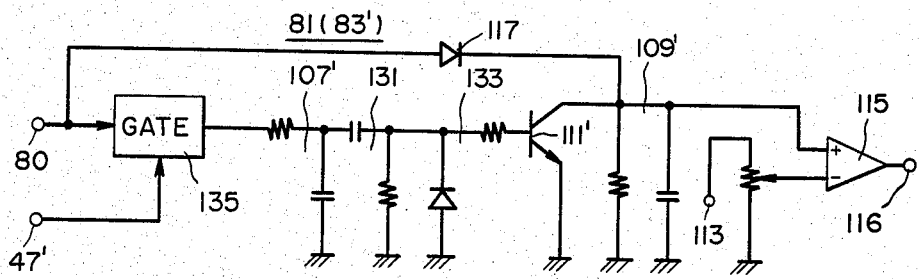
FIG. 10 is a schematic diagram showing another example of a decision circuit for use in the FIG. 7 embodiment.

FIG. 10 is a schematic diagram showing another example of a decision circuit for use in the FIG. 7 embodiment. The FIG. 10 embodiment is characterized by employment of a gate 135 in place of the multiplier 129 in the FIG. 8 embodiment and the remaining portions of the FIG. 11 embodiment are the same as those in the FIG. 8 embodiment. The gate circuit 135 utilizes as a gate signal a square waveform of the frequency of 15 Hz (or 20 Hz) and of the duty cycle of 50% corresponding to the discrimination signal I1 (or I2) from the discrimination signal producing circuit 35. A properly frequency divided output obtained by a frequency divider included in the discrimination signal producing circuit 35 may be utilized as a gate signal and such gate signal is supplied from the output terminal 47'. The other input of the gate circuit 135 is connected to receive a discrimination signal obtained or reproduced from the bandpass filter 77 through the input terminal 80. The reproduced discrimination signal has a predetermined phase relation with respect to the gate signal, i.e. the original discrimination signal I1 or I2 and therefore the output from the gate circuit 135, the output from the low-pass filter 107' and the output from the high-pass filter 131 become as shown as (A), (B) and (C) in FIG. 11. More specifically, the areas of the positive and negative components of the output from the high-pass filter 131 become equal to each other. Accordingly, the output from the rectifying circuit 133 becomes zero and the switching transistor 111' is interrupted. Therefore, the reproduced discrimination signal obtained from the input terminal 80 is supplied through the diode 117 to the smoothing circuit 109' and is smoothed thereby, whereupon the output therefrom is applied to the + input of the comparator 115. As a result, the discrimination signal D1 (or D2) of the high level is obtained from the output terminal 116 of the comparator 115.

On the other hand, in the case where the reproduced signal obtained from the input terminal 80 does not comprise a true discrimination signal I1 or I2, the output from the gate circuit 135, the output from the low-pass filter 107', and the output from the high-pass filter 131 become as shown as (A'), (B') and (C') in FIG. 11. As seen from (C') in FIG. 11, the areas of the positive and negative components of the output from the high-pass filter 131 are different and as a result the output from the rectifying circuit 133 becomes positive, whereby the switching transistor 111' is turned on. Accordingly, a pseudodiscrimination signal to be applied to the smoothing circuit 109' through the diode 117 is caused to flow to the ground potential and as a result the output terminal 116 of the comparator 115 remains the low level.

Even in the above described embodiment, even if a noise component that could be obtained in reproducing a tape recorded not in accordance with the present invention is transferred in detecting a discrimination signal, such noise component is not responded to and as a result malfunction can be effectively prevented from occurring.

It is a matter of course that a modification which is similar to that in the case of the previously described FIG. 1 embodiment could be readily achieved by those skilled in the art even in the case of the FIG. 7 embodiment.

Figure 12:
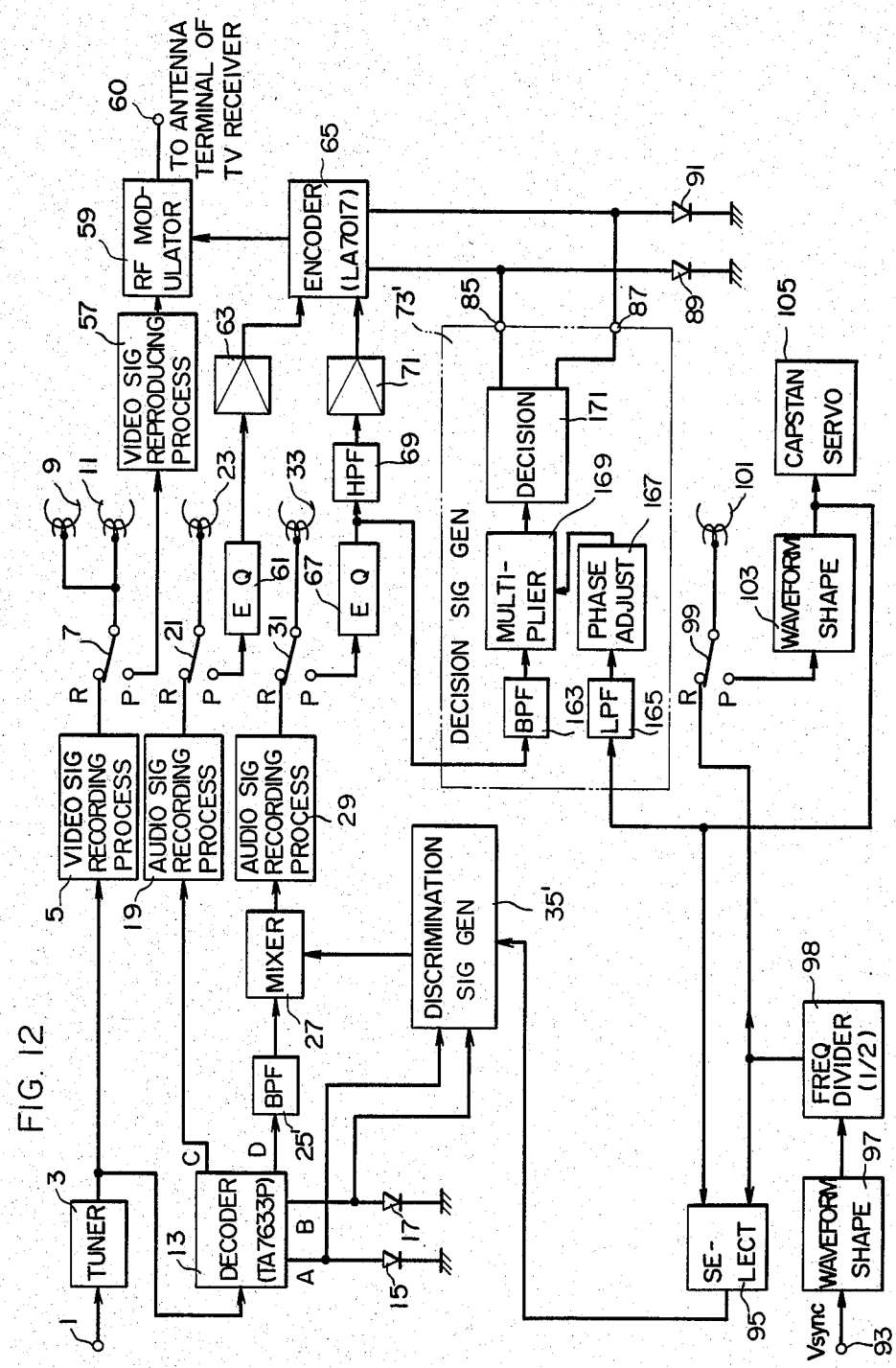
FIG. 12 is a block diagram showing still a further embodiment of the present invention.

FIG. 12 is a block diagram showing still a further embodiment of the present invention. The embodiment shown is different from the previously described embodiments in that the embodiment now description is adapted to contain mode information in terms of the phase of the discrimination signal whereas the embodiments shown in FIGS. 1 and 7 are adapted to contain mode information in terms of the frequency of the discrimination signal.

An audio signal D of the other channel from the decoder 13 is applied to an audio signal recording processing portion 29 through the bandpass filter 25' and the mixer 27. The bandpass filter 25' has the passband of 50 Hz to 15 kHz, for example. Meanwhile, as in the case of the previously described embodiments, the bandpass filter 25' may be replaced by a high-pass filter having the passband of the frequency higher than 50 Hz, for example. More specifically, the bandpass filter 25' serves to interrupt or attenuate an audio signal of the frequency band where a discrimination signal from the discrimination signal producing circuit 35' is to be superimposed out of the audio signal of the other channel.

Figure 14:
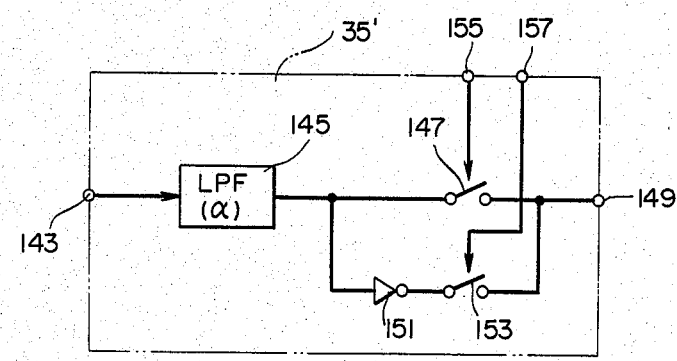
FIG. 14 is a block diagram showing one example of a discrimination signal producing circuit for use in the FIG. 12 embodiment.

The discrimination signal producing circuit 35' is structured to comprise a switch circuit corresponding to the switch circuit 51 in the FIG. 1 embodiment and the details thereof are shown in FIG. 14. Now referring to FIG. 14, the discrimination signal producing circuit 35' is connected to receive a square waveform signal from the frequency divider 98, i.e. the selecting circuit 95 at the input terminal 143. The square waveform signal as the frequency of 30 Hz and is applied to the low-pass filter 145. The low-pass filter 145 has the cut-off frequency of say 30 Hz and has a time delay of α and the output from the low-pass filter 145 is connected through the switch 147 to the output terminal 149. The output from the low-pass filter 145 is connected through a series connection of the inverter 151 and the switch 153 to the output terminal 149. The discrimination signal producing circuit 35' further has input terminals 155 and 157, the input terminal 155 being supplied with the output signal A from the decoder 13 and the input terminal 157 being supplied with the output terminal B. The switches 147 and 153 are rendered conductive when the signal A and B obtained from the input terminals 155 and 157, respectively, are the high level, and are interrupted when the signals A and B from the input terminals 155 and 157, respectively, are the low level.

Now referring to FIG. 13A, description will be made of an operation of the discrimination signal producing circuit 35' and the signals recorded on the second audio track 34 of the tape 10 (FIG. 2) in the respective modes. (A) in FIG. 13A denotes a vertical synchronizing signal Vsync, and (B) of FIG. 13A denotes a square wave signal of 30 Hz obtained from the selection circuit 95. In the case where an audio signal to be recorded is of a stereo mode, the output signal A of the high level obtained from the decoder 13 is applied to the input terminal 155 of the discrimination signal producing circuit 35'. Accordingly, in a stereo mode the switch 147 is closed and the switch 153 is opened. The square wave signal obtained from the input terminal 143 is applied to the low-pass filter 145 and a first discrimination signal shown as (C-1) in FIG. 13A as delayed by a predetermined phase α by the low-pass filter 145 with respect to the square wave signal is obtained. The first discrimination signal is withdrawn from the output terminal 149 through the switch 147.

In the case where an audio signal to be recorded is of a bilingual mode, the output signal B of the high level obtained from the decoder 13 is applied to the input terminal 157 of the discrimination signal producing circuit 35'. Therefore, in a bilingual mode the switch 153 is closed and the switch 147 is opened. On the other hand, a sine wave signal of 30 Hz obtained from the low-pass filter 145 is inverted by the inverter 151. Accordingly, the output sine wave signal from the inverter 151 becomes delayed by a predetermined phase $(\alpha+\pi)$ with respect to the reference signal, i.e. the square wave signal. Thus, in a bilingual mode a second discrimination signal as shown as (C-2) in FIG. 13A is obtained at the output terminal 149.

In the case where an audio signal to be recorded is of a monaural mode, the output signals A and B obtained from the decoder 13 both remain the low level and the switches 147 and 153 included in the discrimination signal producing circuit 35' are both maintained opened. Accordingly, in a monaural mode no particular discrimination signal is obtained as shown as (C-3) in FIG. 13A at the output terminal 149 of the discrimination signal producing circuit 35'.

In a stereo mode, the first discrimination signal as shown as (C-1) in FIG. 13A is obtained from the discrimination signal producing circuit 35' and in a bilingual mode the second discrimination signal as shown as (C-2) in FIG. 13A is obtained from the discrimination signal producing circuit 35'. The discrimination signal obtained from the discrimination signal producing circuit 35' is applied to the mixer 27, where the same is superimposed on the audio signal D of the second channel. A frequency multiplexed signal as shown as (D-1), (D-2) or (D-3) in FIG. 13A is obtained from the mixer 27' in the respective mode. Such frequency multiplexed signal is applied through the audio signal recording processing portion 29 and the switch 31 to the second audio head 33. As a result, such frequency multiplexed signal as shown as (D-1), (D-2) or (D-3) in FIG. 13A is recorded on the second audio track 34 of the tape 10 (FIG. 2).

Figure 15:
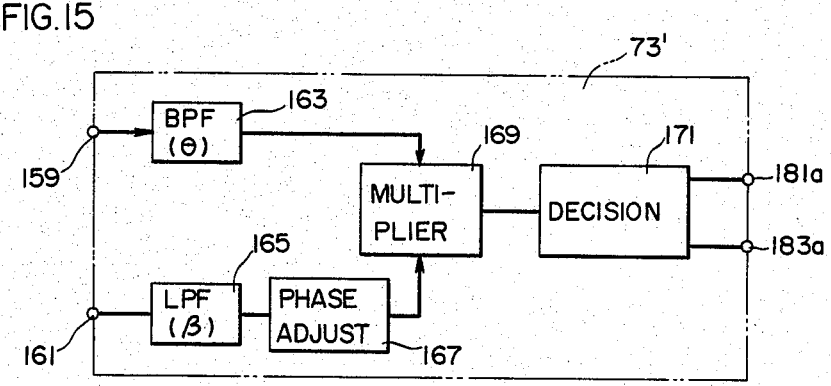
FIG. 15 is a block diagram showing one example of a decision signal generating circuit for use in the FIG. 12 embodiment.

Now a reproducing system will be described. The decision signal generating circuit 73' of the reproducing system is different from that of the previously described FIG. 1 embodiment. The details of the decision signal generating circuit 73' are shown in FIG. 15. Referring to FIG. 15, the decision signal generating circuit 73' comprises two input terminals 159 and 161, one input terminal 159 being supplied with a frequency multiplexed signal recorded from the second audio track 34 by the audio head 33 from the equalizer 67. The other input terminal 161 is supplied with the square wave signal obtained from the waveform shaping circuit 103. The square wave signal 103 comprises a control pulse reproduced from the control head 101 and having the frequency of 30 Hz. The control pulse is also applied to the capstan servo circuit 105. The frequency multiplexed signal (shown as (D-1), (D-2) or (D-3) in FIG. 13A) obtained from the equalizer 67 is applied to the bandpass filter 163. The bandpass filter 163 aims to extract a discrimination signal from the reproduced frequency multiplexed signal and has a time delay $\theta$. Accordingly, the output from the bandpass filter 163 has a phase delay of $\theta$ with respect to the reproduced discrimination signal as shown as (E-1), (E-2) or (E-3) in FIG. 13B in a stereo mode, a bilingual mode or a monaural mode, respectively. On the other hand, a square wave signal obtained from the input terminal 161 is applied to the low-pass filter 165. The low-pass filter 165 may be the same as the previously described low-pass filter 145 (FIG. 14) and has a time delay of $\beta$. Therefore, the output sine wave signal obtained from the low-pass filter 165 has a phase delay of $\beta$ as compared with the square wave signal obtained from the input terminal 161, as shown as (G) in FIG. 13B. The output from the low-pass filter 165 is further applied to the phase adjusting circuit 167. The phase adjusting circuit 167 aims to adjust the phase of the output signal from the low-pass filter 165 so that the phases of the output from the low-pass filter 165 and the reproduced first discrimination signal included in the output from the bandpass filter 165 may coincide with each other and has a phase shift amount of $\gamma$. Accordingly, the output from the phase adjusting circuit 167 has a phase delay of $(\beta+\gamma)$ with respect to the square wave signal as shown as (H) in FIG. 13B. The discrimination signal determining circuit 73' further comprises a multiplying circuit 169 which makes multiplication of the output from the low-pass filter 163 shown as (E-1) or (E-2) in FIG. 13B and the output from the phase adjusting circuit 167 shown as (H) in FIG. 13B. A signal as shown as (I) in FIG. 13B is obtained at the output of the multiplying circuit 169. More specifically, in the case where a recorded audio signal is of a stereo mode a signal as shown by the curve (I-1) in FIG. 13B is obtained and in the case where the recorded audio signal is of a bilingual mode a signal as shown by the curve (I-2) in FIG. 13B is obtained. In the case where a recorded audio signal is of a monaural mode, no alternating current signal is obtained at the output of the multiplying circuit 169 and only a bias voltage component (direct current) is only obtained, as shown (I-3) in FIG. 13B.

The output from the multiplying circuit 169 (shown as (I) in FIG. 13B) is applied to the decision circuit 171. The decision circuit 171 is responsive to the signal from the multiplying circuit 169 to determine the mode of the multiplexed audio signal being reproduced at that time and the details of the decision circuit 171 are shown in FIG. 16.

Figure 16:
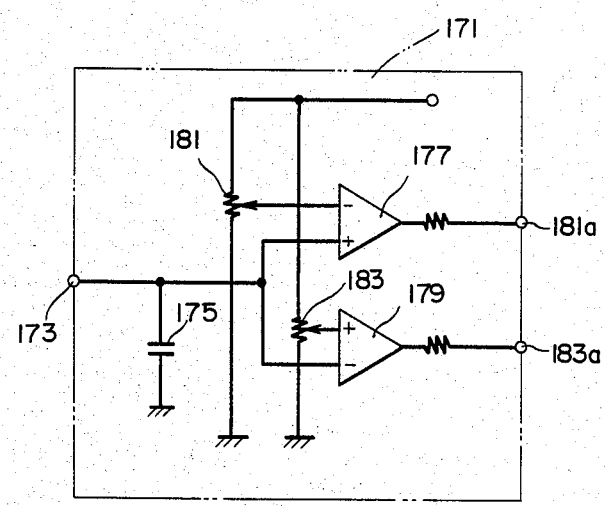
FIG. 16 is a block diagram showing one example of a decision circuit for use in the FIG. 15 embodiment.

Referring to FIG. 16, the decision circuit 171 has an input terminal 173, which is supplied with a signal (shown as (I-1), (I-2) or (I-3) in FIG. 13B) from the multiplying circuit 169. A capacitor 175 for averaging or integrating the output from the multiplying circuit 169 is connected to the input terminal 173 and the terminal voltage of the capacitor 175 is supplied to the + input and the − input of the comparators 177 and 179 such as operational amplifiers. The − input of the comparator 177 is supplied with the first reference level set by the variable resistor 181 and the + input of the comparator 179 is supplied with the second reference level set by the second variable resistor 183. The comparator 177 aims to determine a stereo mode and the comparator 179 aims to determine a bilingual mode. In the case of a stereo mode a signal from the multiplying circuit 169 becomes as shown as (I-1) in FIG. 13B. Accordingly, the terminal voltage of the capacitor 175 becomes as shown as (Vs) in FIG. 13B. Therefore, by applying a potential of the level slightly smaller than the voltage Vs as the first reference level by using the variable resistor 181) it is possible to determine a stereo mode by means of the comparator 177. In the case of a bilingual mode, the signal obtained from the multiplying circuit 165 becomes as shown as (I-2) in FIG. 13B and the terminal voltage of the capacitor 175 becomes of the level shown by Vb in FIG. 13B. Accordingly, by applying a potential having the level slightly larger than the voltage Vb as the second reference level by using the variable resistor 183, it is possible to determine a bilingual mode by means of the comparator 179. Meanwhile, in a monaural mode the signal obtained from the multiplying circuit 169 has the level as shown as Vm in FIG. 13B and accordingly the terminal voltage of the capacitor 175 is also equal to the voltage Vm. Since the voltage Vm is lower than the first reference level of the comparator 177 and is higher than the second reference level of the comparator 179, neither the comparator 177 nor 179 provides the high level signal, i.e. a decision signal. Thus, in the case of a stereo mode a decision signal of the high level is obtained from the output terminal 181 of the decision circuit 171 and in a bilingual mode a decision signal of the high level is obtained from the output terminal 183 of the decision circuit 171 and, in a monaural mode no signal of the high level is obtained from either output terminal 181 or 183.

Now an overall operation of the decision signal generating circuit 73' will be described in some detail. Now description will be made of a case where the first discrimination signal (shown as (C-1) in FIG. 13A) representing a stereo mode is recorded on the second audio track 34 (FIG. 2). A frequency multiplexed signal as shown as (D-1) in FIG. 13A is reproduced from the audio head 33 and the first discrimination signal (shown as (E-1) in FIG. 13B) is extracted by the bandpass filter 163. At that time the output from the filter 163 has a phase delay by $(\alpha+\theta)$ with respect to the reference square wave signal (as shown as (B) in FIG. 13A). Since the capstan motor, not shown, has been controlled by the capstan servo circuit 105 such that the control signal reproduced from the control head 101 may be of the same phase as that of the control signal on the occasion of recording, i.e. as that of the signal shown as (B) in FIG. 13A, a square wave signal as shown as (F) in FIG. 13B of the same phase as that of the signal shown as (B) in FIG. 13A can be obtained by supplying the reproduced control signal to the waveform shaping circuit 103. The square wave signal obtained from the waveform shaping circuit 103 is supplied through the low-pass filter 165 and the phase adjusting circuit 167 to the multiplying circuit 169. The low-pass filter 165 and the phase adjusting circuit 167 have the phase delays of $\beta$ and $(\beta+\gamma)$, respectively. Since the delay amount $\gamma$ has been set to be $\gamma=\alpha+\theta-\beta$, the outputs from the bandpass filter 163 and the phase adjusting circuit 167 become of the same phase. Accordingly, a signal as shown as (I-1) in FIG. 13B is obtained at the output of the multiplying circuit 169. The terminal voltage of the capacitor 175 of the decision circuit 171 becomes Vs due to the above described signal and the voltage Vs exceeds the threshold level of the comparator 177, so that a decision signal of the high level representing a stereo mode is obtained from the comparator 177.

In a bilingual mode a signal as shown as (E-2) in FIG. 13B, i.e. a signal of an inversion in phase of the signal shown as (E-1) in FIG. 13B, is obtained at the output of the bandpass filter 161 of the decision signal generating circuit 173. The signal from the bandpass filter 163 has also a relation of an inversed phase with respect to the output signal from the phase adjusting circuit 167. Therefore, a signal as shown as (I-2) in FIG. 13B is obtained at the output of the multiplying circuit 169. Accordingly, the terminal voltage of the capacitor 175 of the decision circuit 171 becomes Vb as shown in FIG. 13B, as described previously, and the voltage Vb becomes lower than the threshold level of the comparator 179. Accordingly, a decision signal of the high level representing reproduction in a bilingual mode is obtained at the output of the comparator 179.

In the case where reproduction is made in a monaural mode, no signal is obtained at the output of the bandpass filter 163. Accordingly, multiplication by the multiplying circuit 169 of the output from the phase adjusting circuit 167 and the output from the bandpass filter 163 merely provides a bias voltage which does not contain any alternating current component. Therefore, the terminal voltage of the capacitor 175 (FIG. 6) becomes Vm shown in FIG. 13, as described previously, and since the voltage Vm is between the respective threshold levels of the comparators 177 and 179, no signal of the high level is obtained from either the comparator 177 or 179, with the result that an audio signal being reproduced is determined as of a monaural mode.

Figure 17:
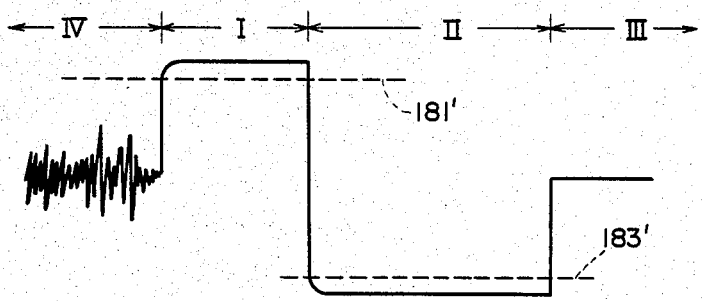
FIGS. 17 and 18 are graphs showing waveforms for explaining an operation of the FIG. 16 embodiment.

FIG. 17 is a graph showing waveforms for explaining the effect of the FIG. 16 embodiment and particularly shows a terminal voltage of the capacitor 175 (FIG. 16). Referring to FIG. 17, the region I denotes a portion where the audio signal to be multiplexed is of a stereo mode and the first discrimination signal has been recorded, the region II denotes a portion where the audio signal to be multiplexed is of a bilingual mode and the second discrimination signal has been recorded, the region III denoting a portion where the audio signal to be multiplexed is of a monaural mode and no discrimination signal has been recorded, and the region IV denotes a portion where the second audio track 34 (FIG. 2) is recorded not in accordance with the embodiment of the present invention and frequencies sufficiently low as an audio signal are included. As seen from FIG. 17, it is possible to clearly discriminate a stereo mode, a bilingual mode or a monaural mode by the reference levels 181' and 183' being set by the variable resistors 181 and 183 (FIG. 6). Even in the case where an audio signal having no discrimination signal recorded, i.e. not in accordance with the embodiment of the present invention and including a low-frequency component is reproduced, the reproduction level, i.e. the terminal voltage of the capacitor 175 (FIG. 16) comes to the position between the decision levels 181' and 183', whereby there is no fear of malfunction being caused due to such low-frequency component which is not of a discrimination signal.

Figure 18:
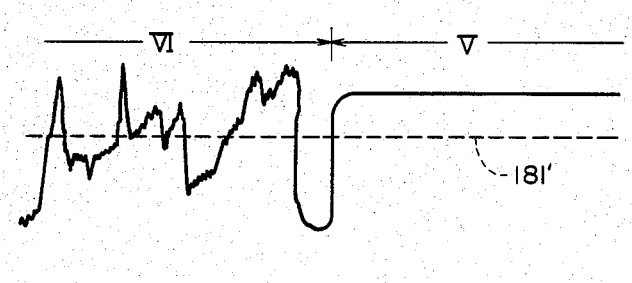
Figure 20:
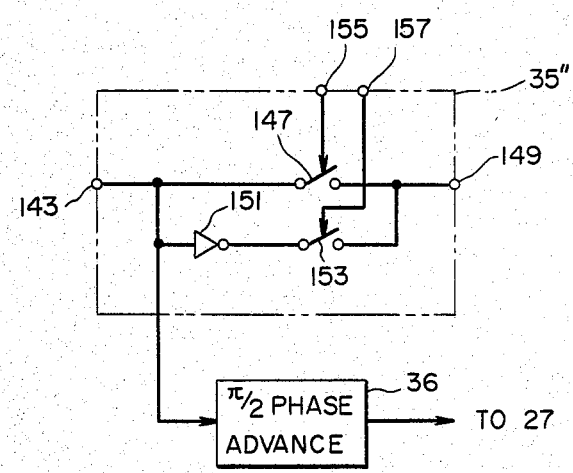
FIG. 20 is a block diagram showing a major portion of the FIG. 19 embodiment.

By contrast, in FIG. 18 malfunction occurs due to a low-frequency component which is not of a discrimination signal. FIG. 18 shows a case where detection is made whether only a low-frequency signal exists or not by not relying upon the FIG. 12 embodiment. More specifically, in the case where the multiplying circuit 169 (FIG. 15) is not employed as in the embodiment shown, it follows that the terminal voltage of the capacitor 175 (FIG. 16) comes to exceed a portion exceeding the reference level 181' due to the reproduced low-frequency signal existing in the region VI, with the result that a decision signal of the stereo mode is obtained as in the case of the region V. Withdrawal of a decision signal representing a stereo mode in the region VI is clearly malfucntion. However, according to the FIG. 12 embodiment, such malfunction as shown in FIG. 18 can be effectively prevented.

Figure 19:
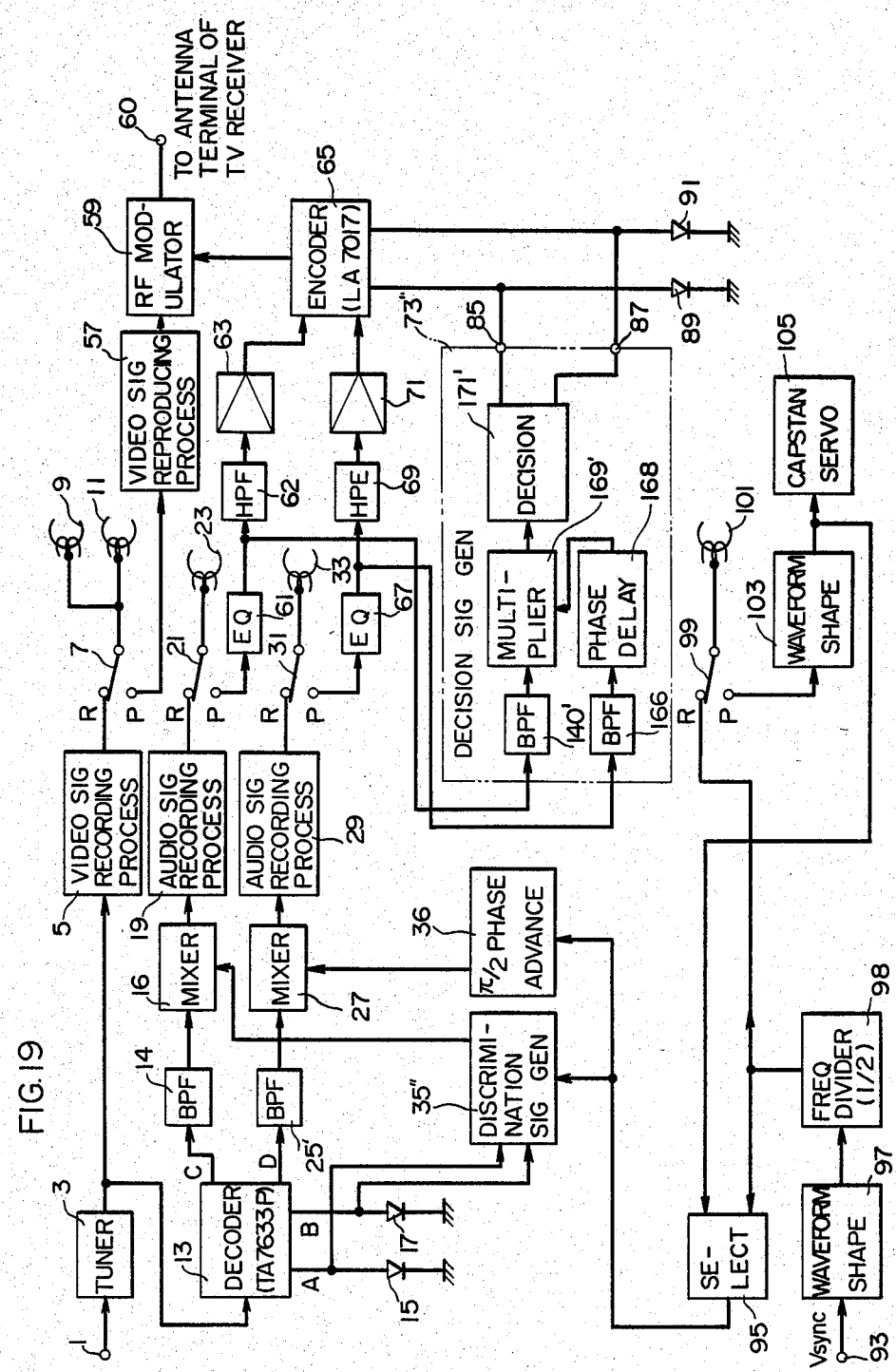
FIG. 19 is a block diagram showing still a further embodiment of the present invention.
Figure 22:
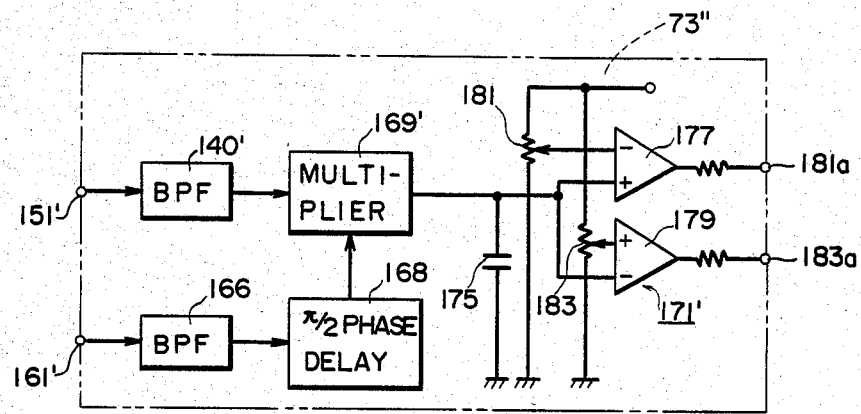
FIG. 22 is a block diagram showing a decision signal generating circuit of the FIG. 19 embodiment.

FIG. 19 is a block diagram showing still a further embodiment of the present invention. The FIG. 19 embodiment comprises a modification of the FIG. 12 embodiment and is similar to the FIG. 12 embodiment in that information representing the mode is contained in terms of the phase component of the discrimination signal. The FIG. 19 embodiment is adapted such that the discrimination signal is recorded in both the two audio tracks 24 and 34 of the tape 10 (FIG. 2). To that end, a bandpass filter 14 and a mixer 16 are interposed on the path of an audio signal of one channel from the decoder 13. A discrimination signal producing circuit 35" and a $\pi/2$ phase advancing circuit 36 are also provided for the purpose of superimposing the respective discrimination signals on the audio signal of two channels. The discrimination signal producing circuit 35" performs substantially the same operation as that of the FIG. 14 embodiment. More specifically, the discrimination signal producing circuit 35" produces as a first discrimination signal I1 a sine wave signal of 30 Hz as shown as (C-1) in FIG. 13A in a stereo mode and provides a second discrimination signal I2 of a phase inversion as shown as (C-2) in FIG. 13A at the output terminal 149 in a bilingual mode. In a monaural mode no signal is obtained from the discrimination signal producing circuit 35". The $\pi/2$ phase advancing circuit 36 comprises a differentiating circuit, for example, and is adapted to provide a further discrimination signal I3 having an intermediate phase relation between the first and second discrimination signals. The first or second discrimination signal I1 or I2 from the output terminal 149 of the discrimination signal producing circuit 35" is applied to the mixer 16 and the further discrimination signal I3 from the $\pi/2$ phase advancing circuit 36 is applied to the mixer 27. Accordingly, the discrimination signals I1 or I2 and I3 shown as (D) and (E) in FIG. 21 as well as a corresponding channel audio signal are recorded on the first and second audio tracks 24 and 34 (FIG. 2).

Now a reproducing circuit will be described. The reproducing circuit comprises a decision signal generating circuit 73". In the embodiment shown, a high-pass filter 62 corresponding to a high-pass filter 69 is interposed at the subsequent stage of an equalizer 61 for balancing both audio channels. The input terminals 151' and 161' included in the decision signal generating circuit 73" are connected to receive the reproduced signal from the first audio track 24 and the reproduced signal of the second audio track 34 from the equalizers 61 and 67, respectively. The bandpass filter 140' aims to extract the first or second discrimination signal from the reproduced signal applied to the input terminal 151'. The reproduced signal from the equalizer 67 being applied from the input terminal 161' is applied to the multiplying circuit 169' through the bandpass filter 166 and the $\pi/2$ phase delaying circuit 168. The $\pi/2$ phase delaying circuit 168 comprises an integrating circuit, for example, so that the output from the bandpass filter 166 may be delayed in phase by $\pi/2$. As shown as (F) in FIG. 21, in the stereo mode and the bilingual mode, i.e. in the regions X and Y, the first discrimination signals I1 and I2 which are different in terms of phase by $\pi$ from each other are included at the output from the bandpass filter 140'. On the other hand, the output from the $\pi/2$ delay circuit 168 comprises a signal component having the further discrimination signal I3 (shown as (E) in FIG. 21) recorded in the second audio track 34 delayed by $\pi/2$, as shown as (G) in FIG. 21.

Figure 23:
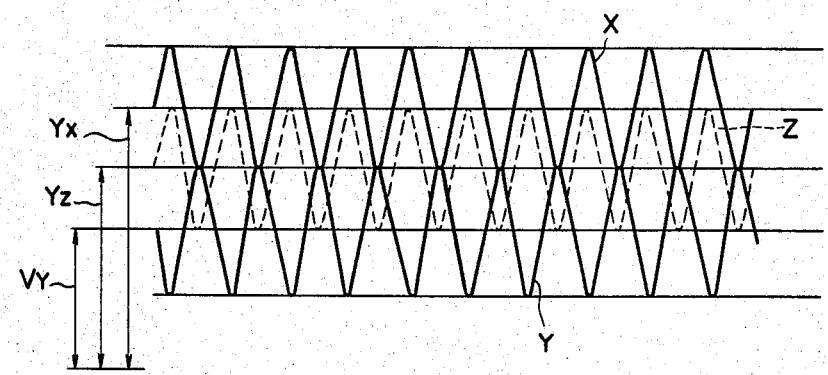
FIG. 23 is a graph showing waveforms for explaining an operation of the FIG. 22 diagram.

Accordingly, in a stereo mode the discrimination signals I1 and I3 being applied to the multiplying circuit 169' are of the same phase and therefore a signal as shown by the curve X in FIG. 23 is obtained from the multiplying circuit 169'. Conversely, in a bilingual mode the discrimination signals I2 and I3 being applied to the multiplying circuit 169' are of the opposite phase relation and a signal as shown by the curve Y in FIG. 23 is obtained from the multiplying circuit 169'. Meanwhile, in the monaural mode, i.e. in the Z read, no signal has been recorded in the first audio track 24 and the further discrimination signal I3 has only been recorded in the second audio track 34 and therefore a signal as shown by the dotted line Z in FIG. 23 is obtained as an output of the multiplying circuit 169'. Thus, an alternating current signal as shown as the line X, Y or Z in FIG. 23 is obtained at the output of the multiplying circuit 169' depending on a stereo mode, bilingual mode or a monaural mode.

Accordingly, the terminal voltage of the capacitor 175 included in the decision circuit 171' exhibits clearly different levels Vx, Vy and Vz depending on a stereo mode, bilingual mode and a monaural mode, as shown as (H) in FIG. 21. Therefore, a decision signal of the high level is obtained from the comparator 177 in a stereo mode. In the case of a bilingual mode, a decision of the high level is obtained from the comparator 179 and in the case of a monaural mode no signal of the high level is obtained from either the comparator 177 or 179.

FIG. 21 shows by (A), (B) and (C) in a comparison manner the cases in accordance with the FIG. 12 embodiment.

According to the FIG. 19 embodiment, even if the fixing positions of the respective heads 23, 33 and 101 are slightly dislocated for each model or for each set, erroneous mode detection is not made and hence the embodiment is extremely effective. More specifically, in the case of general video tape recorders, spacing between either audio track 24 or 34 and the control track 102 is extremely large as compared with the spacing between the first and second audio tracks 24 and 34 (FIG. 2). Therefore, in consideration of the fixing precision of general heads, the spacing between the audio head and the control head is liable to be largely different for each model or for each set and hence a phase deviation of a reproduced control signal could arise with respect to the reproduced discrimination signal unless the spacing between the heads is correctly adjusted for each model or set. Accordingly, in the case where the reproducted control signal is utilized as a reference phase signal of the decision signal generating circuit as shown in FIG. 12, accurate adjustment of the head positions was necessitated. By contrast, according to the FIG. 19 embodiment, the reproduced control signal is not utilized for the purpose of determining the modes and necessity is eliminated to take into consideration such diversification of such fixing precision, with the result that convenience is extremely enhanced. More specifically, in the FIG. 19 embodiment, since the first or second discrimination signal I1 or I2 representing the mode and having different phase is recorded in the first audio track and a further discrimination signal I3 having the phase corresponding to the intermediate phase of the first and second discrimination signals is recorded in the second audio track, so that the further discrimination signal I3 may be utilized as a reference phase signal, no influence is caused from the fixing error of the control head, dislocation of the positions, or the like. Therefore, according to the embodiment shown, a mode automatic decision system excellent in compatibility is provided.

Meanwhile, the FIG. 19 embodiment may be adapted such that the phases of the first and second discrimination signals may be different from each other by $\pi/4$ and the separate discrimination signal is set to have the phase which has deviated from the intermediate phase and the decision signal generating circuit may be modified in accordance with such adaptation, in which case the same effects are performed as a matter of course. Such changes, modifications, adaptations or the like could be readily performed by those skilled in the art.

In the foregoing, description was made of the embodiments in which the mode discrimination signal as well as the audio signal is recorded in an audio track. However, the present invention can be embodied in a modification set forth in the following. More specifically, the present invention may be embodied such that a mode discrimination signal as well as a video signal is recorded in a video track and the mode discrimination signal is extracted from the signal reproduced from the video track, whereupon decision is made of a stereo mode, a bilingual mode or a monaural mode in response to the extracted discrimination signal. In such case, the frequency range of the signals that can be recorded in and reproduced from the video track is wide and therefore the mode discrimination signal need not be limited to a low frequency signal but rather a discrimination signal included in a standard television broadcasting signal as such may be recorded.

Although in the foregoing the embodiments were described as embodied in accordance with the NTSC system, the present invention can be equally applicable to the PAL system, as a matter of course.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A video signal recording/reproducing apparatus, comprising:
   a recording medium including at least one audio track, at least one video track and at least one control track,
   video track recording means for recording a video signal in said video track,
   audio track recording means for recording an audio signal corresponding to said signal in said audio track,
   said audio signal being recordable in a stereo mode, a bilingual mode or a monaural mode, corresponding to the video signal to be recorded,
   control track recording means for recording a control signal in said control track,
   mode discrimination signal producing means for generating a mode discrimination signal of a relatively low frequency representing the mode of said audio signal,
   discrimination signal providing means coupled to said mode discrimination signal producing means and adapted to receive said audio signal for providing said mode discrimination signal as well as said audio signal to said audio track recording means,
   select means for providing a signal to be used for generating said mode discrimination signal to said discrimination signal providing means,
   said select means providing to said discrimination signal providing means a signal which is identical to said control signal to be recorded in said control track of said recording medium by said control track recording means on the occasion of recording,
   video track reproducing means for reproducing the video signal from said video track,
   audio track reproducing means for reproducing said audio signal and said mode discrimination signal from said audio track,
   means for reproducing said control signal recorded in said control track,
   means for bringing said reproduced control signal to a predetermined phase relation with said reproduced mode discrimination signal,
   decision signal generating means responsive to the mode discrimination signal included in the reproduced signal from said audio track reproducing means for generating a decision signal representing the mode of said audio signal by comparing said reproduced control signal brought to said predetermined phase relation and said reproduced mode discrimination signal.

2. A video signal recording/reproducing apparatus in accordance with claim 1, which further comprises
   multiplexing means (65) responsive to the audio signal from said audio track reproducing means (23, 33) and the decision signal from said decision signal generating means (73, 73', 73") for producing an audio signal multiplexed in said stereo mode, bilingual mode or monaural mode.

3. A video signal recording/reproducing apparatus in accordance with claim 2, which further comprises
   video signal reproducing processing means (57) for reconstructing the reproduced video signal from said video track reproducing means (9, 11) to a television signal, and
   RF modulating means responsive to the reproduced processed video signal obtained from said video signal reproducing processing means (57) and the multiplexed audio signal obtained from said multiplexing means (65) for producing a standard radio frequency television signal.

4. A video signal recording/reproducing apparatus in accordance with any one of the preceding claims 1, 2 or 3, wherein
   said at least one audio track is comprised of first and second audio tracks (24, 34), and
   said audio track recording means comprises two audio recording heads (23, 33) for recording the audio signals of two substantially different channels in said first and second audio tracks, respectively, in said stereo mode and said bilingual mode and for recording the audio signals of two substantially identical channels in said first and second audio tracks in said monaural mode,
   said audio track reproducing means comprises two audio reproducing heads (23, 33) corresponding to said first and second audio tracks, respectively,
   said mode discrimination signal being recorded in at least one (34) of said first and second audio tracks together with at least one of said audio signals of said two channels by means of at least one (33) of said two audio recording heads.

5. A video signal recording/reproducing apparatus in accordance with claim 4, wherein
   said audio recording heads and said audio reproducing heads include two combination record/playback audio heads (23, 33), and which further comprises
   two switching means (21, 31) for supplying the audio signal to be recorded to said two audio heads and for supplying the signal reproduced from said two audio heads to said decision signal generating means (73, 73', 73") and said multiplexing means (65).

6. A video signal recording/reproducing apparatus in accordance with claim 4, wherein
   said discrimination signal producing means (35) comprises first and second frequency signal generating means (39, 41) for generating a first and second frequency signals of the different frequencies in two selected ones of said three modes,
   said audio track recording means (33) recording the corresponding one of said first and second frequency signals in response to one or the other of said two selected modes and not for recording the discrimination signal in the remaining modes, said decision signal generating means (73) comprises decision means (81, 83) for generating a decision signal representing one mode when said first frequency signal is obtained from said audio track reproducing means, representing another mode when said second frequency signal is obtained from said audio track reproducing means, and representing the remaining mode when neither said first nor said second frequency signal is obtained from said audio track reproducing means.

7. A video signal recording/reproducing apparatus in accordance with claim 6, wherein
said decision signal generating means (73) comprises
a first bandpass filter (77) having a passband corresponding to said first frequency signal,
a second bandpass filter (79) having a passband corresponding to said second frequency signal, and
means (115) coupled to said first and second bandpass filters (77, 79) for detecting the levels of said first and second frequency signals received from said first and second bandpass filters, respectively.

8. A video signal recording/reproducing apparatus in accordance with claim 6, which further comprises
means (107, 111, 129, 135) coupled to said mode discrimination signal producing means and said audio track reproducing means for comparing said first frequency signal from said mode discrimination signal producing means (35) and said first frequency signal reproduced from said audio track reproducing means (33) or comparing said second frequency signal obtained from said mode discrimination signal producing means (35) and said second frequency signal reproduced from said audio track reproducing means (33) for determining whether said reproduced frequency signal is of a true discrimination frequency signal.

9. A video signal recording/reproducing apparatus in accordance with claim 8, wherein
said decision signal generating means comprises
a first bandpass filter (77) having a passband corresponding to said first frequency signal,
a second bandpass filter (79) having a passband corresponding to said second frequency signal,
means (115) coupled to said first and second bandpass filters (77, 79) for detecting the levels of the outputs from said first and second bandpass filters, and which further comprises
means (111, 111') responsive to the output from said determining, means (107, 111, 129, 135) for inhibiting transfer of said first or second frequency signals to said level detecting means (115).

10. A video signal recording/reproducing apparatus in accordance with claim 9, wherein
said determining means comprises multiplying means (129) for making multiplication of the frequency signal obtained from said mode discrimination signal producing means (35) and the frequency signal reproduced from said bandpass filters (77, 79).

11. A video signal recording/reproducing apparatus in accordance with claim 10, wherein
said inhibiting means comprises
a low-pass filter (107') for receiving the output from said multiplying means (129),
a high-pass filter (131) for receiving the output from said low-pass filter (107'),
a rectifying circuit (133) for receiving the output from said high-pass filter (131), and
switching means interposed between said bandpass filters (77, 79) and said level detecting means (115) and responsive to the output from said rectifying circuit (133) for inhibiting transfer of the signal from said bandpass filters to said level detecting means.

12. A video signal recording/reproducing apparatus in accordance with claim 9, wherein
said determining means comprises gate means (135) for receiving the frequency signal from said mode discrimination signal producing means (35) and the frequency signal reproduced from said bandpass filters (77, 79) as two inputs thereto.

13. A video signal recording/reproducing apparatus in accordance with claim 12, wherein
said inhibiting means comprises
a low-pass filter (107') for receiving the output from said gate means (135),
a high-pass filter (131) for receiving the output from said low-pass filter (107'),
a rectifying circuit (133) for receiving the output from said high-pass filter (131), and
switching means (111') interposed between said bandpass filters (77, 79) and said level detecting means (115) and responsive to the outputs from said rectifying circuit (133) for inhibiting transfer of the signal from said bandpass filters to said level detecting means.

14. A video signal recording/reproducing apparatus in accordance with claim 5, wherein
said video signal includes a television signal having a synchronizing signal, and further includes
first and second frequency signal generating means comprising frequency dividing means (39, 41) responsive to said synchronizing signal for producing a first and second frequency signals of different frequencies.

15. A signal recording/reproducing apparatus, comprising:
a recording medium including at least one audio track and at least one control track;
audio track recording means for recording an audio signal corresponding to said video signal in said audio track,
said audio signal being recordable in a stereo mode, a bilingual mode or a monaural mode;
control track recording means for recording a control signal in said control track;
mode discrimination signal producing means for generating a mode discrimination signal of a relatively low frequency representing the mode of said audio signal;
discrimination signal providing means coupled to said mode discrimination signal producing means and adapted to receive said audio signal for providing said mode discrimination signal as well as said audio signal to said audio track recording means;
select means for providing a signal to be used for generating said mode discrimination signal to said discrimination signal providing means,
said select means providing to said discrimination signal providing means a signal which is identical to said control signal to be recorded in said control track of said recording medium by said control track recording means on the occassion of recording;

audio track reproducing means for reproducing said audio signal and said mode discrimination signal from said audio track;

means for reproducing said control signal recorded in said control track;

means for bringing said reproduced control signal to a predetermined phase relation with said reproduced mode discrimination signal; and decision signal generating means responsive to the mode discrimination signal included in the reproduced signal from said audio track reproducing means for generating a decision signal representing the mode of said audio signal by comparing said reproduced control signal brought to said predetermined phase relation and said reproduced mode discrimination signal.

* * * * *